US011987765B2

(12) United States Patent
Goto et al.

(10) Patent No.: US 11,987,765 B2

(45) Date of Patent: May 21, 2024

(54) COMPOSITION, AND THREADED CONNECTION FOR PIPES INCLUDING LUBRICANT COATING LAYER FORMED FROM THE COMPOSITION

(71) Applicants: NIPPON STEEL CORPORATION, Tokyo (JP); VALLOUREC OIL AND GAS FRANCE, Aulnoye-Aymeries (FR)

(72) Inventors: Kunio Goto, Tokyo (JP); Tomoka Abe, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 17/416,247

(22) PCT Filed: Dec. 25, 2019

(86) PCT No.: PCT/JP2019/050986

§ 371 (c)(1),
(2) Date: Jun. 18, 2021

(87) PCT Pub. No.: WO2020/145162

PCT Pub. Date: Jul. 16, 2020

(65) Prior Publication Data

US 2022/0064561 A1 Mar. 3, 2022

(30) Foreign Application Priority Data

Jan. 7, 2019 (JP) ................................ 2019-000871

(51) Int. Cl.
*C10M 169/00* (2006.01)
*C10M 101/02* (2006.01)
(Continued)

(52) U.S. Cl.
CPC ...... *C10M 169/00* (2013.01); *C10M 101/025* (2013.01); *C10M 103/02* (2013.01);
(Continued)

(58) Field of Classification Search
CPC .............. C10M 129/70; C10M 125/10; C10M 125/18; C10M 101/025; C10M 169/044;
(Continued)

(56) References Cited

U.S. PATENT DOCUMENTS

2003/0144158 A1 7/2003 Petelot
2009/0220780 A1 9/2009 Bordet et al.
(Continued)

FOREIGN PATENT DOCUMENTS

JP 2004507698 A 3/2004
JP 2009512819 A 3/2009
(Continued)

OTHER PUBLICATIONS

ENEOS Corporation, Tetrax (Polyisobutylene) _Search by Product; 3 pages, (Feb. 3, 2023).
(Continued)

*Primary Examiner* — Vishal V Vasisth

(74) *Attorney, Agent, or Firm* — Greer, Burns & Crain, Ltd.

(57) ABSTRACT

The composition according to the present disclosure is a composition for forming a lubricant coating layer on or above a threaded connection for pipes, and contains poly-isobutylene, a metal soap, a wax and a basic metal salt of an aromatic organic acid. The threaded connection for pipes according to the present disclosure includes: a pin having a pin-side contact surface which includes a pin-side threaded portion; a box having a box-side contact surface which includes a box-side threaded portion; and a lubricant coating layer formed from the aforementioned composition as an
(Continued)

44 4 21 34 3 outermost layer on or above at least one of the pin-side contact surface and the box-side contact surface.

17 Claims, 7 Drawing Sheets

(51) Int. Cl.

| | |
|---|---|
| ***C10M 103/02*** | (2006.01) |
| ***C10M 107/08*** | (2006.01) |
| ***C10M 107/38*** | (2006.01) |
| ***C10M 111/04*** | (2006.01) |
| ***C10M 117/02*** | (2006.01) |
| ***C10M 129/50*** | (2006.01) |
| ***C10M 129/54*** | (2006.01) |
| ***C10M 135/10*** | (2006.01) |
| ***F16L 15/00*** | (2006.01) |
| ***F16L 15/08*** | (2006.01) |
| *C10N 50/08* | (2006.01) |

(52) U.S. Cl.

CPC ........ *C10M 107/08* (2013.01); *C10M 107/38* (2013.01); *C10M 111/04* (2013.01); *C10M 117/02* (2013.01); *C10M 129/50* (2013.01); *C10M 129/54* (2013.01); *C10M 135/10* (2013.01); *F16L 15/006* (2013.01); *F16L 15/08* (2013.01); *C10M 2205/0265* (2013.01); *C10M 2205/163* (2013.01); *C10M 2207/1265* (2013.01); *C10M 2207/141* (2013.01); *C10M 2207/144* (2013.01); *C10M 2213/0623* (2013.01); *C10M 2219/044* (2013.01); *C10N 2050/08* (2013.01)

(58) Field of Classification Search

CPC .............. C10M 125/26; C10M 147/02; C10M 169/04; C10M 145/14; C10M 2201/087; C10M 2201/081; C10M 2207/125; C10M 2203/1006; C10M 2201/062; C10M 2201/105; C10M 2209/084; C10M 2201/061; C10M 2213/02; C10M 2205/022; C10M 2205/14; C10M 2205/18; C10M 2205/16; C10M 2207/281; C10M 2213/062; C10M 2207/126; C09D 7/48; C09D 5/08; F16L 15/004; F16L 58/182; C08K 5/098; C10N 2050/02; C10N 2010/04; C10N 2080/00; C10N 2010/08; C10N 2030/06; C10N 2030/12; C10N 2040/00; C10N 2010/10

See application file for complete search history.

(56) References Cited

U.S. PATENT DOCUMENTS

| | | | | |
|---|---|---|---|---|
| 2010/0051199 | A1* | 3/2010 | Nooren | C09J 5/00 156/334 |
| 2010/0167968 | A1 | 7/2010 | Pinel et al. | |
| 2010/0264649 | A1 | 10/2010 | Goto et al. | |
| 2010/0301600 | A1 | 12/2010 | Goto et al. | |
| 2011/0285124 | A1* | 11/2011 | Pinel | C10M 169/04 285/94 |
| 2013/0276294 | A1 | 10/2013 | Goto et al. | |
| 2015/0001841 | A1 | 1/2015 | Oshima et al. | |
| 2015/0191674 | A1 | 7/2015 | Goto et al. | |
| 2015/0315848 | A1* | 11/2015 | Gard | F16L 15/00 403/307 |
| 2016/0115312 | A1* | 4/2016 | Bahl | C08L 23/20 524/313 |
| 2017/0138526 | A1 | 5/2017 | Goto et al. | |

FOREIGN PATENT DOCUMENTS

| | | | |
|---|---|---|---|
| JP | 2010523785 | A | 7/2010 |
| JP | 2014501885 | A | 1/2014 |
| JP | 2014535023 | A | 12/2014 |
| WO | 2009057754 | A1 | 5/2009 |
| WO | 2009072486 | A1 | 6/2009 |
| WO | 2014024755 | A1 | 2/2014 |
| WO | 2015198557 | A1 | 12/2015 |

OTHER PUBLICATIONS

ENEOS Corporation, Nisseki Polybutene (Polybutene) _Search by Product; 9 pages, (May 10, 2022).

* cited by examiner

COMPOSITION, AND THREADED CONNECTION FOR PIPES INCLUDING LUBRICANT COATING LAYER FORMED FROM THE COMPOSITION

This is a National Phase Application filed under 35 U.S.C. § 371, of International Application No. PCT/JP2019/050986, filed Dec. 25, 2019, the contents of which are incorporated by reference.

TECHNICAL FIELD

The present disclosure relates to a composition, and a threaded connection for pipes including a lubricant coating layer formed from the composition.

BACKGROUND ART

Oil country tubular goods are used for drilling in oil fields and natural gas fields. Oil country tubular goods are formed by connecting a plurality of steel pipes in accordance with the depth of the well. Connection of the steel pipes is performed by fastening together threaded connections for pipes that are formed at the ends of the steel pipes.

A pin-box structure constituted by a member referred to as a "pin" and a member referred to as a "box" may be mentioned as an example of a typical threaded connection for pipes that is used to fasten oil country tubular goods. The pin includes a pin-side threaded portion that is formed on the outer peripheral surface at an end portion of a steel pipe. The pin may also include a pin-side metal seal portion and a pin-side shoulder portion. The box includes a box-side threaded portion that is formed in the inner peripheral surface at an end portion of a steel pipe. The box may also include a box-side metal seal portion and a box-side shoulder portion. When steel pipes are being fastened together, the pin-side threaded portion and the box-side threaded portion come in contact with each other. In a case where the threaded connections for pipes include metal seal portions and shoulder portions, when fastening is performed, the metal seal portions come in contact with each other, as do the shoulder portions.

During the process of lowering oil country tubular goods, the oil country tubular goods may be lifted up again from the oil well for various reasons such as the occurrence of some troubles. A threaded connection for pipes which had previously been fastened may then be loosened, and thereafter refastened and lowered into the oil well again. The threaded portions, metal seal portions and shoulder portions of the pin and the box are repeatedly exposed to strong friction during fastening and loosening of the steel pipes. If these regions are not sufficiently resistant to friction, galling (unrepairable galling) will occur during repeated fastening and loosening. Therefore, threaded connections for pipes are required to have sufficient resistance to friction, that is, excellent galling resistance.

Conventionally, a viscous liquid lubricant (a greasy lubricant) which contains heavy metal powders that is referred to as "dope" or "compound grease" has been used to improve the galling resistance and gas tightness of threaded connections for pipes. The compound grease is applied to contact surfaces of the threaded connections (that is, to threaded portions, or in a case where the threaded connection for pipes has metal seal portions and shoulder portions, to threaded portions, metal seal portions and shoulder portions). An example of compound grease is specified in API standards BUL 5A2.

However, heavy metals, such as Pb, contained in compound greases may affect the environment. For this reason, various lubricant coatings have been proposed as novel lubricants to take the place of compound greases.

International Application Publication No. 2009/057754 (Patent Literature 1) and International Application Publication No. 2014/024755 (Patent Literature 2) propose compositions for forming a lubricant coating layer which is excellent in galling resistance and which does not contain a heavy metal that may affect the environment.

The composition for forming a lubricant coating in a threaded connection for pipes described in Patent Literature 1 includes one of, or both of, rosin and calcium fluoride, and a metal soap, a wax and a basic metal salt of an aromatic organic acid. Because this composition for forming a lubricant coating substantially does not contain a harmful heavy metal such as lead, the impact on the global environment is extremely small. Further, a lubricant coating that is formed from this composition is also excellent in anti-rust properties, and suppresses the occurrence of rust during storage of the threaded connection for pipes. It is described in Patent Literature 1 that, accordingly, even when tightening and loosening are repeated, the threaded connection for pipes continuously exhibits a lubricating function, and gas tightness can be secured after tightening.

A composition for forming a lubricant coating on or above a threaded connection for pipes described in Patent Literature 2 contains melamine cyanurate, a basic metal salt of an aromatic organic acid, and one or more types of material selected from the group consisting of a pine resin-based material, a wax, a metal soap and a lubricant powder. It is described in Patent Literature 2 that by forming a lubricant coating using this composition, the occurrence of rust in the threaded connection for pipes is suppressed, the threaded connection for pipes continuously exhibits a lubricating function even when tightening and loosening are repeated, and gas tightness can be secured after tightening.

CITATION LIST

Patent Literature

Patent Literature 1: International Application Publication No. 2009/057754

Patent Literature 2: International Application Publication No. 2014/024755

SUMMARY OF INVENTION

Technical Problem

In this connection, when fastening a threaded connection for pipes, the torque when fastening is completed (hereunder, referred to as "fastening torque") is set so that a sufficient seal interfacial pressure is obtained irrespective of the size of the thread interference amount. In the final stage of fastening, the interfacial pressure between threads increases. If torque stably increases without galling occurring even in a case where the interfacial pressure is high, adjustment of the fastening torque will be easy. Therefore, threaded connections for pipes are required to have performance that causes the torque to stably increase even at a time of high interfacial pressure. Hereinafter, this performance is referred to as "high torque performance".

In the case of a threaded connection for pipes that has shoulders, high torque performance is defined as performance that maintains the rate of torque increase immediately after shouldering in a region in which the number of turns of a steel pipe is higher than shouldering torque in a torque chart which shows the relation between the number of turns of a steel pipe and the torque during fastening. In the case of a threaded connection for pipes that has shoulders, high torque performance can be expressed as a torque on shoulder resistance ΔT'.

In a case where a threaded connection for pipes has shoulder portions, the shoulder portions of the pin and box come in contact with each other during fastening. Torque that arises at such time is called "shouldering torque". During fastening of a threaded connection for pipes, after the shouldering torque is reached, the fastening is continued further until fastening is completed. By this means, the gas tightness of the threaded connection for pipes is enhanced. If fastening is excessively performed, metal constituting at least one of the pin and the box starts to undergo plastic deformation. The torque that arises at such time is referred to as "yield torque". The term "torque on shoulder resistance ΔT'" refers to a difference between the aforementioned shouldering torque and the aforementioned yield torque.

In a case where a threaded connection for pipes has shoulder portions, if the torque on shoulder resistance ΔT' is large, adjustment of the fastening torque will be easy. Even in a case where a threaded connection for pipes does not have shoulder portions, as long as the torque stably increases at a time of high interfacial pressure, adjustment of the fastening torque will be easy.

A lubricant coating that improves galling resistance and facilitates adjustment of fastening torque can be formed by means of the compositions disclosed in Patent Literature 1 and Patent Literature 2. However, it is preferable that excellent galling resistance and high torque performance can be obtained by another composition and lubricant coating also.

An objective of the present disclosure is to provide a composition for obtaining a threaded connection for pipes that has excellent galling resistance and excellent high torque performance, and a threaded connection for pipes including a lubricant coating layer formed from the composition and which has excellent galling resistance and excellent high torque performance.

Solution to Problem

The composition according to the present disclosure is a composition for forming a lubricant coating layer on or above a threaded connection for pipes, the composition containing polyisobutylene, a metal soap, a wax, and a basic metal salt of an aromatic organic acid.

The threaded connection for pipes according to the present disclosure includes: a pin having a pin-side contact surface including a pin-side threaded portion; a box having a box-side contact surface including a box-side threaded portion; and a lubricant coating layer formed from the aforementioned composition as an outermost layer on or above at least one of the pin-side contact surface and the box-side contact surface.

Advantageous Effects of Invention

A threaded connection for pipes according to the present disclosure includes, as an outermost layer, a lubricant coating layer containing polyisobutylene, a metal soap, a wax and a basic metal salt of an aromatic organic acid. Therefore, the threaded connection for pipes according to the present disclosure exhibits excellent galling resistance even when fastening is repeated. The threaded connection for pipes according to the present disclosure also exhibits excellent high torque performance.

DESCRIPTION OF EMBODIMENTS

The present embodiment will be described in detail below with reference to the drawings. The same reference symbols will be used throughout the drawings to refer to the same or like parts, and description thereof will not be repeated.

The present inventors conducted various studies regarding the relation between a composition for forming a lubricant coating layer of a threaded connection for pipes and the galling resistance and high torque performance of the threaded connection for pipes. As a result, the present inventors obtained the findings described hereinafter.

Figure 1:
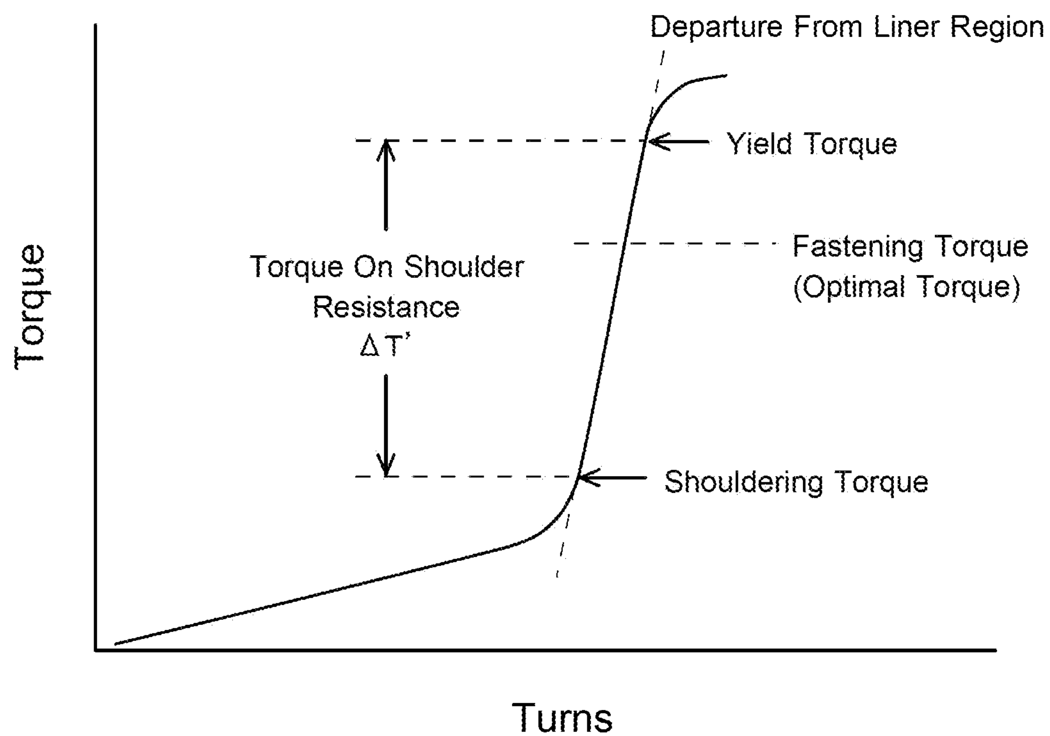
FIG. 1 is a graph illustrating the relation between the number of turns of a steel pipes and the torque during fastening of a threaded connection for pipes that has a shoulder portion.

During fastening of steel pipes to each other, the optimal torque to end the fastening is determined in advance. FIG. 1 is a graph illustrating the relation between the number of turns of steel pipes and the torque during fastening of threaded connections for pipes that have a shoulder portion. FIG. 1 is also referred to as "torque chart". Referring to FIG. 1, fastening of the threaded connections for pipes initially increases the torque in proportion to the number of turns. The rate of increase in the torque at such time is low. As fastening continues, the shoulder portions come in contact with each other. The torque at such time is referred to as "shouldering torque". After the shouldering torque is reached, when fastening is continued, the torque again increases in proportion to the number of turns. The rate of increase in the torque at such time is higher than prior to reaching the shouldering torque. The fastening is completed at a time point at which the torque reaches a predetermined numerical value (fastening torque).

If the torque during fastening reaches the fastening torque, the metal seal portions interfere with each other with an appropriate interfacial pressure. In this case, the gas tightness of the threaded connections for pipes increases. Further, in an oil well, high compressional stress and high bending stress are applied to a threaded connection. To ensure that the fastening of a threaded connection for pipes does not loosen under such stresses, it is necessary for the threaded connection for pipes to be fastened with a sufficiently high torque (appropriate fastening torque).

If fastening is further continued after the fastening torque is reached, the torque becomes too high. If the torque becomes too high, a part of the pin and the box undergoes a plastic deformation. The torque at such time is referred to as “yield torque”. When the torque on shoulder resistance ΔT' which is the difference between the shouldering torque and the yield torque is large, a margin can be provided with respect to the range of the fastening torque. As a result, it is easy to adjust the fastening torque. Therefore, a larger value for the torque on shoulder resistance ΔT' is preferable.

In order to make the torque on shoulder resistance ΔT' larger, it is effective to lower the shouldering torque or to increase the yield torque. However, even if the composition of the lubricant coating layer is changed so that the coefficient of friction simply increases or decreases, in general the shouldering torque and the yield torque behave in the same way. For example, if the coefficient of friction of the lubricant coating layer increases, although the yield torque becomes higher, the shouldering torque also becomes higher (referred to as “high shouldering”). As a result, in some cases even if a predetermined tightening torque is reached, shoulder portions do not come in contact and tightening is not completed (referred to as “no shouldering”). Conversely, if the coefficient of friction of the lubricant coating layer decreases, although the shouldering torque becomes lower, the yield torque also becomes lower. Consequently, in some cases the shoulder portion or the seal portion yields at a low tightening torque, and fastening at a high tightening torque cannot be performed.

As a result of conducting intensive studies, the present inventors obtained the hitherto unknown finding that by containing polyisobutylene in a lubricant coating layer, the yield torque can be made larger while maintaining the shouldering torque at the same level as the conventional value, and the torque on shoulder resistance ΔT can be increased. This point will be described in detail using the drawings.

Figure 2:
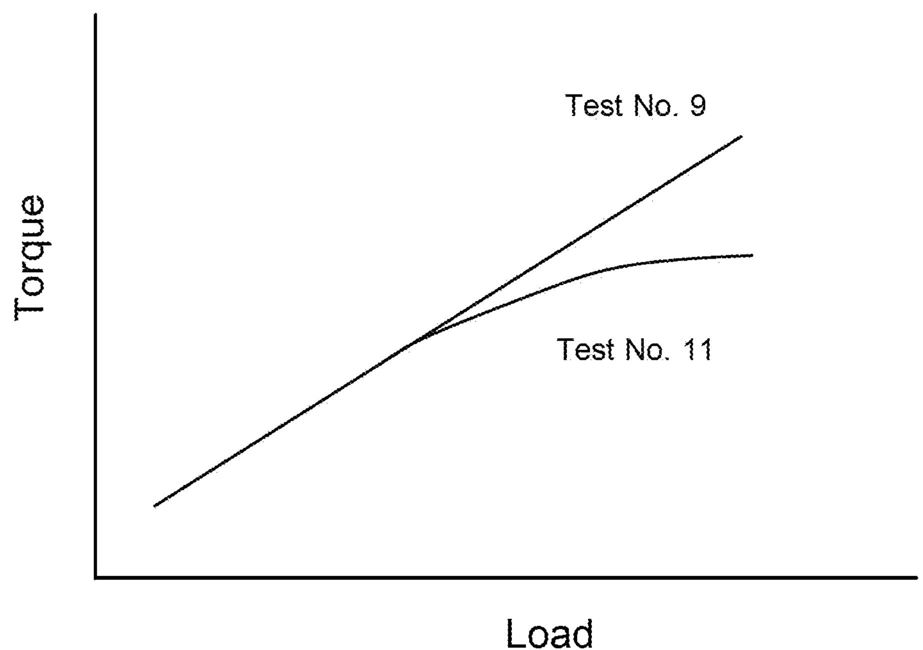
FIG. 2 is a graph illustrating results obtained when the Falex test was performed using compositions of Test No. 9 and Test No. 11 in an example.

FIG. 2 is a graph illustrating results obtained by performing the Falex test using the compositions shown in Test No. 9 and Test No. 11 in an example. The Falex test is a test in which a rotating journal pin is inserted between two V-shaped blocks, and which measures a load applied to the blocks and frictional torque that is generated by application of the load. A method for measuring a galling load by means of the Falex test is defined, for example, in ASTM D 3233. FIG. 2 is a line graph that, for cases where the composition of Test No. 9 or Test No. 11 was applied onto the surface of a journal pin and the journal pin was rotated, shows results obtained by measuring a load applied to the blocks and by measuring a frictional torque that arose between the rotating journal pin and the V-shaped blocks. The ordinate in FIG. 2 represents the frictional torque. The abscissa in FIG. 2 represents the load applied to the blocks.

Referring to FIG. 2, within a range of a certain extent from a state in which the load is low, torque rose in a similar manner for the case where the composition of Test No. 9 was used and for the case where the composition of Test No. 11 was used. However, in the case where the composition of Test No. 11 that did not contain polyisobutylene was used, the rate of increase in the torque decreased when the load increased beyond a certain amount. This means that, in the final stage of the fastening illustrated in FIG. 1, when the load (interfacial pressure) applied to the metal seal portions and the shoulder portions rises sharply, the increase in torque becomes slower in the case of the composition that does not contain polyisobutylene. In other words, in the region in which the number of turns is higher than the shouldering torque in the torque chart illustrated in FIG. 1, the rate of torque increase cannot be maintained immediately after shouldering. In this case, the yield torque cannot be increased. However, in the case that used the composition of Test No. 9 that contained polyisobutylene, the rate of increase in the torque did not decrease even after the load increased beyond a certain amount. This means that, in the final stage of fastening illustrated in FIG. 1, the increase in torque also continues when the load (interfacial pressure) rises sharply. In other words, in the region in which the number of turns is higher than the shouldering torque in the torque chart illustrated in FIG. 1, the rate of torque increase is maintained immediately after shouldering. In this case, the yield torque can be increased.

Figure 3:
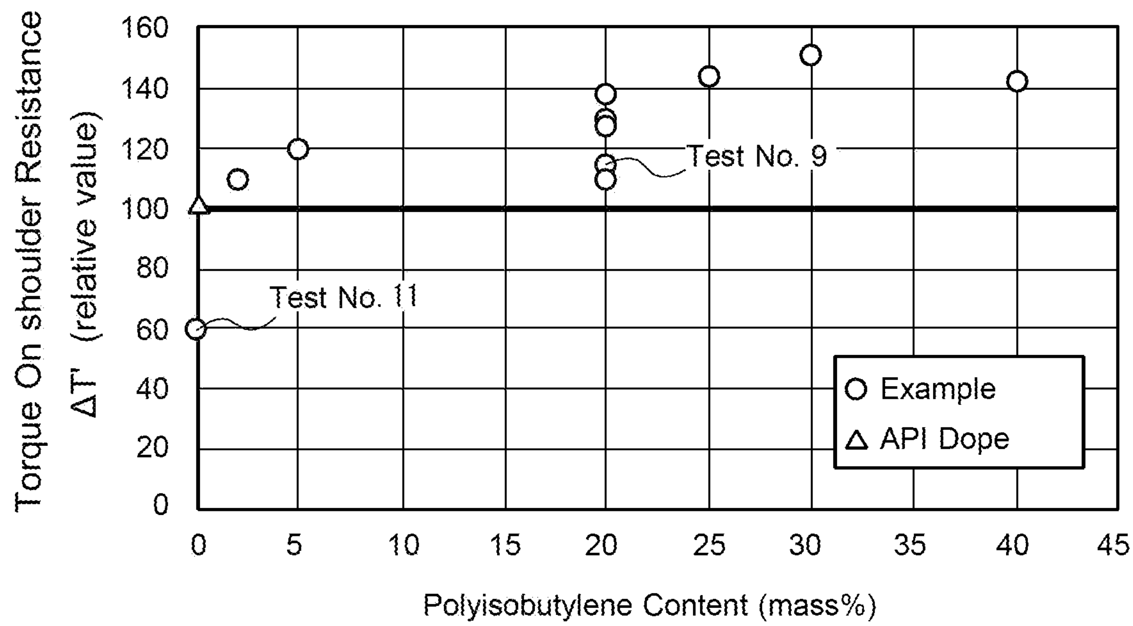
FIG. 3 illustrates the relation between a content (mass %) of polyisobutylene in a lubricant coating layer and a torque on shoulder resistance ΔT' (relative value).

The torque on shoulder resistance ΔT is made larger by raising the yield torque while suppressing the shouldering torque to a low amount. FIG. 3 illustrates the relation between the content (mass %) of polyisobutylene in the lubricant coating layer and the torque on shoulder resistance ΔT (relative value). FIG. 3 was obtained by means of examples that are described later. The ordinate in FIG. 3 represents the torque on shoulder resistance ΔT (relative value). The abscissa in FIG. 3 represents the content (mass %) of polyisobutylene in the lubricant coating layer. Note that, the respective numerical values for the torque on shoulder resistance ΔT (relative value) are numerical values that were determined as relative values with respect to the torque on shoulder resistance ΔT of the example when using an API standards dope instead of a lubricant coating layer is taken as a reference (100). A white circular mark (○) in FIG. 3 denotes the torque on shoulder resistance ΔT (relative value) for an example in which a lubricant coating layer was formed. A triangular mark (Δ) in FIG. 3 denotes the torque on shoulder resistance ΔT (reference value, i.e. 100) when the API standards dope was used instead of a lubricant coating layer.

Referring to FIG. 3, in Test No. 11 which did not contain polyisobutylene, the torque on shoulder resistance ΔT (relative value) was 60. On the other hand, in Test No. 9 which contained polyisobutylene, the torque on shoulder resistance ΔT (relative value) was 115. In the threaded connections for pipes that included a lubricant coating layer consisting of a composition containing polyisobutylene, the torque stably increased even under a high interfacial pressure in the final stage of fastening, without increasing the shouldering torque. Consequently, the yield torque was high. As a result, the torque on shoulder resistance ΔT' (relative value) was more than 100.

Referring to FIG. 3, it was found that when the lubricant coating layer contains polyisobutylene, the torque on shoulder resistance ΔT' (relative value) was more than 100 in the other examples also. In other words, when the lubricant coating layer contains polyisobutylene, excellent high torque performance is obtained.

The present inventors also found that when the lubricant coating layer contains polyisobutylene, galling resistance is obtained that is equivalent to the galling resistance obtained when using a conventional API dope or that is higher than the galling resistance obtained when using a conventional API dope.

Figure 4:
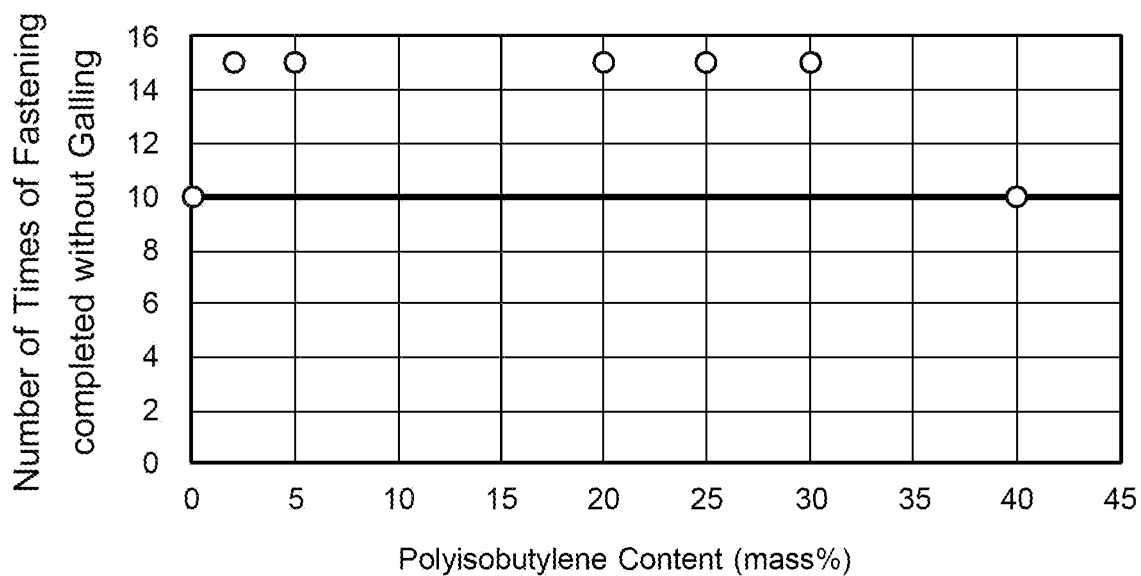
FIG. 4 illustrates the relation between a content (mass %) of polyisobutylene in a lubricant coating layer and galling resistance.

FIG. 4 illustrates the relation between the content (mass %) of polyisobutylene in a lubricant coating layer and the galling resistance. FIG. 4 was obtained by means of examples that are described later. The ordinate in FIG. 4 represents the number of times fastening was completed without the occurrence of either unrepairable galling at a threaded portion or galling at a metal seal portion. The abscissa in FIG. 4 represents the content (mass %) of polyisobutylene in the lubricant coating layer.

Referring to FIG. 4, when the lubricant coating layer contained polyisobutylene, the number of times that fastening was repeated without giving rise to galling was ten times which is the same as the conventional API dope, or was more than ten times. In other words, when the lubricant coating layer contains polyisobutylene, not only is excellent high torque performance obtained, but excellent galling resistance is also obtained.

As described above, when the lubricant coating layer contains polyisobutylene, excellent galling resistance is also obtained, and not only excellent high torque performance. The detailed mechanism by which the high torque performance and galling resistance of a threaded connection for pipes is enhanced by the lubricant coating layer containing polyisobutylene has not been clarified. However, the present inventors consider that the mechanism is as follows.

Polyisobutylene is a polymer that is in a semi-solid state at normal temperature (approximately 25° C.), and it is considered that polyisobutylene easily dissolves in the wax contained in the lubricant coating layer. There is also a possibility that, when the threaded connection for pipes slides, polyisobutylene can suppress a decrease in the viscosity of the wax even if the temperature increases. It is considered that, as a result, high torque performance of the threaded connection for pipes is obtained. Further, in this case, because the viscosity of the wax in the lubricant coating layer is maintained, there is a possibility that the thickness of the lubricant coating layer is maintained. It is considered that, as a result, the galling resistance performance improves.

The composition of the present embodiment that was completed based on the above findings is a composition for forming a lubricant coating layer on or above a threaded connection for pipes, and contains polyisobutylene, a metal soap, a wax, and a basic metal salt of an aromatic organic acid.

The composition of the present embodiment contains polyisobutylene, a metal soap, a wax, and a basic metal salt of an aromatic organic acid. Therefore, a threaded connection for pipes that includes a lubricant coating layer formed from the aforementioned composition has excellent galling resistance and excellent high torque performance.

Preferably, when a total amount of non-volatile components in the composition is taken as 100 mass %, the aforementioned composition contains: the polyisobutylene: 5 to 30 mass %, the metal soap: 2 to 30 mass %, the wax: 2 to 30 mass %, and the basic metal salt of an aromatic organic acid: 10 to 70 mass %.

In this case, the galling resistance and high torque performance of the threaded connection for pipes are further enhanced.

Preferably, the aforementioned composition also contains a lubricant powder.

In this case, the lubricity of the threaded connection for pipes increases.

Preferably, when a total amount of non-volatile components in the composition is taken as 100 mass %, the composition contains the lubricant powder in the amount of 0.5 to 20 mass %.

Preferably, the aforementioned lubricant powder is one or more types selected from the group consisting of graphite and polytetrafluoroethylene.

The aforementioned composition may further contain a volatile organic solvent.

The threaded connection for pipes of the present embodiment includes: a pin having a pin-side contact surface including a pin-side threaded portion; a box having a box-side contact surface including a box-side threaded portion; and a lubricant coating layer formed from the aforementioned composition as an outermost layer on or above at least one of the pin-side contact surface and the box-side contact surface.

When the threaded connection for pipes includes a lubricant coating layer formed from a composition containing polyisobutylene, a metal soap, a wax, and a basic metal salt of an aromatic organic acid as an outermost layer on or above at least one of a pin-side contact surface and a box-side contact surface, the galling resistance and high torque performance of the threaded connection for pipes improve.

The threaded connection for pipes may include the aforementioned lubricant coating layer on or above the pin-side contact surface.

Preferably, the threaded connection for pipes further includes a plating layer between the pin-side contact surface and the lubricant coating layer.

In this case, the galling resistance and corrosion resistance of the threaded connection for pipes increase.

Preferably, the threaded connection for pipes further includes a chemical conversion treatment layer between the lubricant coating layer and the plating layer.

In this case, the adhesiveness of the lubricant coating layer increases.

Preferably, in a case where the threaded connection for pipes does not include the plating layer, the pin-side contact surface is a surface that is subjected to one or more types of treatment selected from the group consisting of a blasting treatment and pickling, and in a case where the threaded connection for pipes includes the plating layer, the plating layer surface is a surface that is subjected to one or more types of treatment selected from the group consisting of a blasting treatment and pickling.

The threaded connection for pipes may include the aforementioned lubricant coating layer on or above the box-side contact surface.

Preferably, the threaded connection for pipes also includes a plating layer between the box-side contact surface and the lubricant coating layer.

In this case, the galling resistance and corrosion resistance of the threaded connection for pipes increase.

Preferably, the threaded connection for pipes further includes a chemical conversion treatment layer between the lubricant coating layer and the plating layer.

In this case, the adhesiveness of the lubricant coating layer increases.

Preferably, in a case where the threaded connection for pipes does not include the plating layer, the box-side contact surface is a surface that is subjected to one or more types of treatment selected from the group consisting of a blasting treatment and pickling, and in a case where the threaded connection for pipes includes the plating layer, the plating layer surface is a surface that is subjected to one or more types of treatment selected from the group consisting of a blasting treatment and pickling.

Preferably, the pin-side contact surface of the threaded connection for pipes further includes a pin-side metal seal portion and a pin-side shoulder portion, and the box-side contact surface further includes a box-side metal seal portion and a box-side shoulder portion.

Hereinafter, the composition according to the present embodiment, and a threaded connection for pipes that includes a lubricant coating layer formed from the composition according to the present embodiment will be described in detail.

[Threaded Connection for Pipes]

Figure 5:
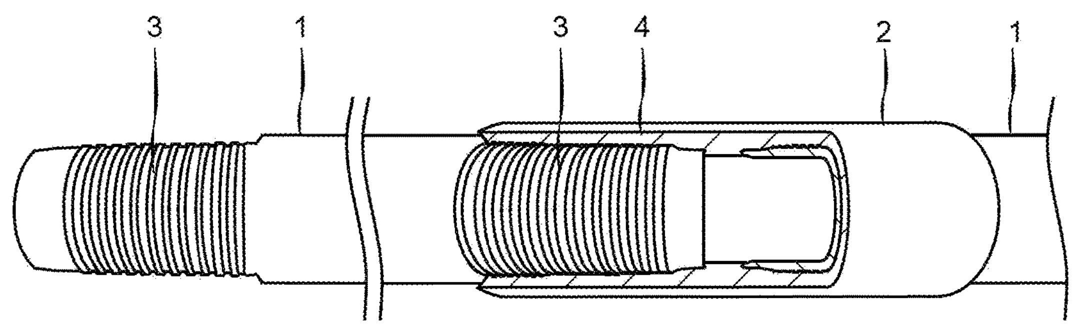
FIG. 5 is a view illustrating a configuration of a coupling-type threaded connection for pipes according to the present embodiment.

The threaded connection for pipes includes a pin and a box. FIG. 5 is a view illustrating a configuration of a coupling-type threaded connection for pipes according to the present embodiment. Referring to FIG. 5, the threaded connection for pipes includes a steel pipe 1 and a coupling 2. A pin 3 having a pin-side threaded portion is formed on the outer surface at both ends of the steel pipe 1. A box 4 having a box-side threaded portion is formed in the inner surface at both ends of the coupling 2. The coupling 2 is attached to an end of the steel pipe 1 by fastening the pin 3 and box 4 together. Although not illustrated in the drawing, the pin 3 of the steel pipe 1 and the box 4 of the coupling 2 that are not coupled to a mating member may have a protector attached thereto to protect their respective threaded portions.

Figure 6:
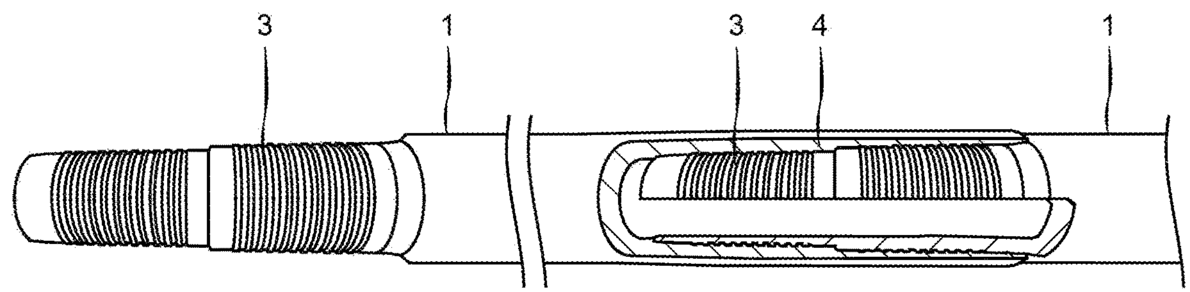
FIG. 6 is a view illustrating a configuration of an integral-type threaded connection for pipes according to the present embodiment.

On the other hand, an integral-type threaded connection for pipes may also be used, in which the coupling 2 is not used and, instead, one of the ends of the steel pipe 1 is used as the pin 3, and the other end is used as the box 4. FIG. 6 is a view illustrating a configuration of an integral-type threaded connection for pipes according to the present embodiment. Referring to FIG. 6, the threaded connection for pipes includes the steel pipe 1. The pin 3 having a pin-side threaded portion is formed on the outer surface at one of the ends of the steel pipe 1. At the other end of the steel pipe 1, the box 4 having a box-side threaded portion is formed in the inner surface. Two of the steel pipes 1 can be connected together by fastening the pin 3 and box 4 together. The threaded connection for pipes of the present embodiment can be used for both a coupling-type threaded connection for pipes and an integral-type threaded connection for pipes.

Figure 7:
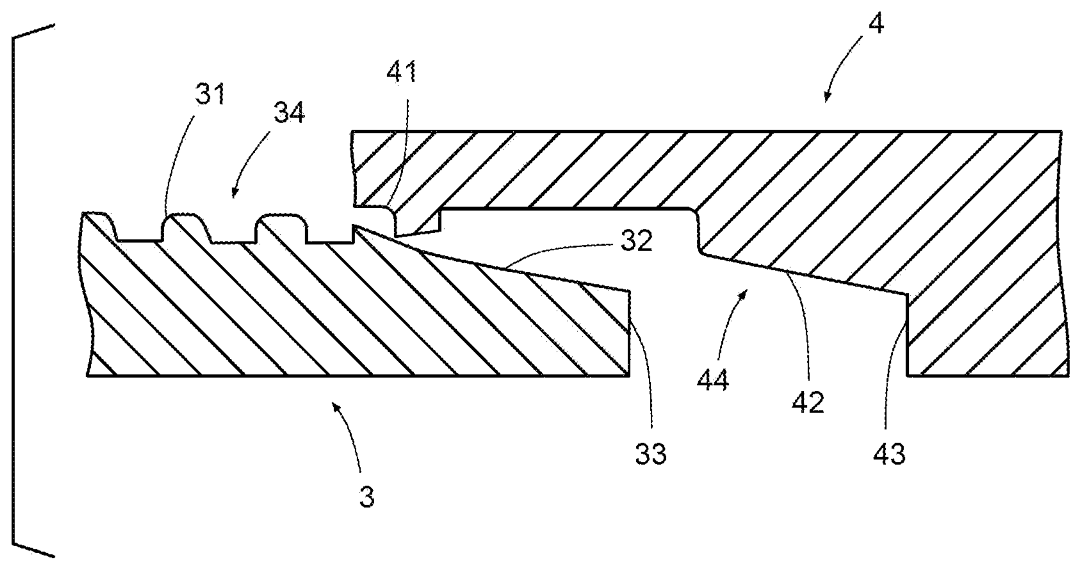
FIG. 7 is a cross-sectional view of a threaded connection for pipes.

FIG. 7 is a cross-sectional view of a threaded connection for pipes. In FIG. 7, the pin 3 includes a pin-side threaded portion 31, a pin-side metal seal portion 32 and a pin-side shoulder portion 33. In FIG. 7, the box 4 includes a box-side threaded portion 41, a box-side metal seal portion 42 and a box-side shoulder portion 43. The portions at which the pin 3 and the box 4 come into contact with each other when they are fastened together are referred to as "contact surfaces 34 and 44". Specifically, when the pin 3 and the box 4 are fastened to each other, the two threaded portions (pin-side threaded portion 31 and box-side threaded portion 41) come into contact with each other, and so do the two metal seal portions (pin-side metal seal portion 32 and box-side metal seal portion 42), and the two shoulder portions (pin-side shoulder portion 33 and box-side shoulder portion 43). In FIG. 7, the pin-side contact surface 34 includes the pin-side threaded portion 31, the pin-side metal seal portion 32 and the pin-side shoulder portion 33. In FIG. 7, the box-side contact surface 44 includes the box-side threaded portion 41, the box-side metal seal portion 42 and the box-side shoulder portion 43.

In FIG. 7, in the pin 3, the pin-side shoulder portion 33, the pin-side metal seal portion 32 and the pin-side threaded portion 31 are arranged in that order from the end of the steel pipe 1. Further, in the box 4, the box-side threaded portion 41, the box-side metal seal portion 42 and the box-side shoulder portion 43 are arranged in that order from the end of the steel pipe 1 or the coupling 2. However, the arrangement of the pin-side threaded portion 31 and the box-side threaded portion 41, the pin-side metal seal portion 32 and the box-side metal seal portion 42, and the pin-side shoulder portion 33 and the box-side shoulder portion 43 is not limited to the arrangement illustrated in FIG. 7, and the arrangement can be changed as appropriate. For example, as illustrated in FIG. 6, in the pin 3 the aforementioned portions may be arranged from the end of the steel pipe 1 in the order of the pin-side metal seal portion 32, the pin-side threaded portion 31, the pin-side metal seal portion 32, the pin-side shoulder portion 33, the pin-side metal seal portion 32 and the pin-side threaded portion 31. In the box 4, the aforementioned portions may be arranged from the end of the steel pipe 1 or the coupling 2 in the order of the box-side metal seal portion 42, the box-side threaded portion 41, the box-side metal seal portion 42, the box-side shoulder portion 43, the box-side metal seal portion 42 and the box-side threaded portion 41.

Figure 8:
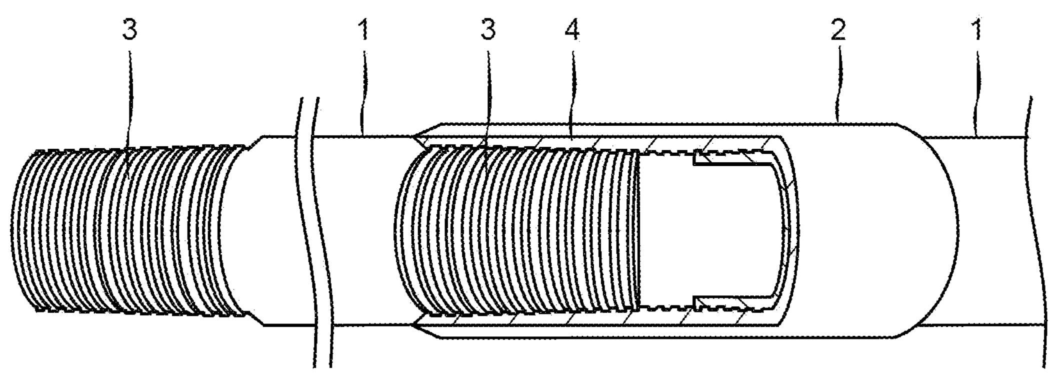
FIG. 8 is a view illustrating the structure of a threaded connection for pipes that does not have a metal seal portion and a shoulder portion according to the present embodiment.

In FIG. 5 and FIG. 6, so-called "premium joints" which include metal seal portions (pin-side metal seal portion 32 and box-side metal seal portion 42) and shoulder portions (pin-side shoulder portion 33 and box-side shoulder portion 43) are illustrated. However, the metal seal portions (pin-side metal seal portion 32 and box-side metal seal portion 42) and the shoulder portions (pin-side shoulder portion 33 and box-side shoulder portion 43) need not be included. A threaded connection for pipes which does not have the metal seal portions 32 and 42 and the shoulder portions 33 and 43 is illustrated in FIG. 8. The lubricant coating layer of the present embodiment is also favorably applicable to the threaded connection for pipes which does not have the metal seal portions 32 and 42 and the shoulder portions 33 and 43. In a case where the metal seal portions 32 and 42 and the shoulder portions 33 and 43 are not present, the pin-side contact surface 34 includes the pin-side threaded portion 31. In a case where the metal seal portions 32 and 42 and the shoulder portions 33 and 43 are not present, the box-side contact surface 44 includes the box-side threaded portion 41.

[Lubricant Coating Layer]

Figure 9:
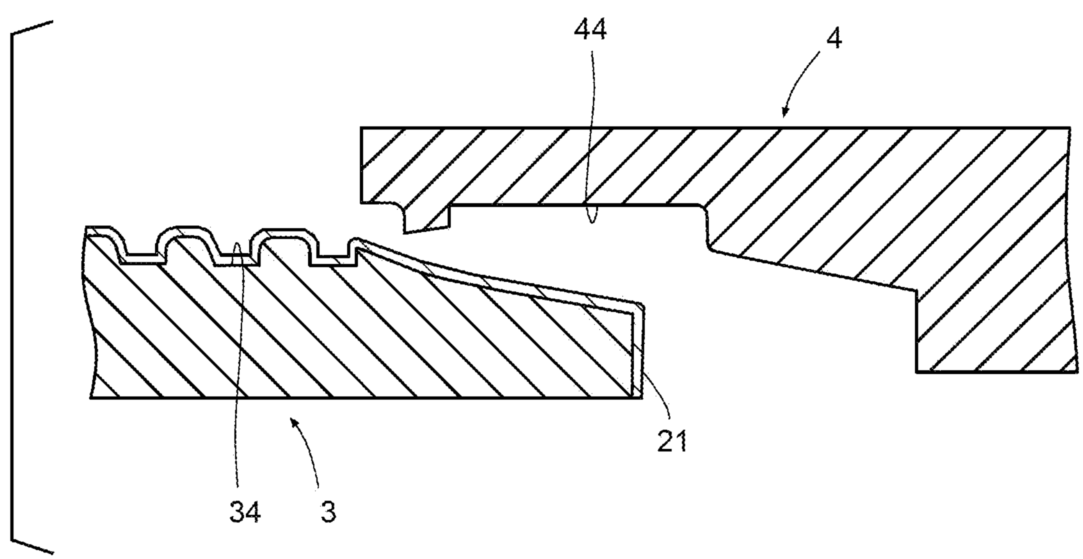
FIG. 9 is a cross-sectional view of a threaded connection for pipes according to the present embodiment.

The threaded connection for pipes includes a lubricant coating layer on or above at least one of the pin-side contact surface 34 and the box-side contact surface 44. FIG. 9 is a cross-sectional view of the threaded connection for pipes according to the present embodiment. In accordance with a production method that is described later, a lubricant coating layer 21 is formed by applying a composition for forming the lubricant coating layer 21 onto at least one of the pin-side contact surface 34 and the box-side contact surface 44, and thereafter drying the composition.

[Composition for Forming Lubricant Coating Layer 21]

The composition for forming the lubricant coating layer 21 contains polyisobutylene, a metal soap, a wax and a basic metal salt of an aromatic organic acid. Accordingly, the lubricant coating layer 21 also contains polyisobutylene, a metal soap, a wax and a basic metal salt of an aromatic organic acid. The composition may be a solventless type composition (that is, containing only the aforementioned components), or may be a solvent-based composition in which the components are dissolved in a solvent. In the case of a solvent-based composition, the mass percent of each component refers to a mass percent in a case where the total amount of non-volatile components of the composition (the mass obtained as the sum of all components excluding the solvent contained in the composition) is taken as 100%. That is, the content of each component in the composition and the content of each component in the lubricant coating layer 21 are equal to each other. Hereinafter, the composition for forming the lubricant coating layer 21 is also referred to simply as "the composition".

Hereunder, each component in the composition will be described in detail. Unless specifically stated otherwise, the symbol "%" in relation to each component means "mass percent based on a total amount of non-volatile components in the composition". In the present embodiment, the term "non-volatile components" means all components other than a solvent that are contained in the composition. The term "non-volatile components" refers to, for example, polyisobutylene, a metal soap, a wax and a basic metal salt of an aromatic organic acid.

[Polyisobutylene]

Polyisobutylene is a polymer of isobutene that is represented by the general formula —(—C$(CH_3)_2$—$CH_2$—$)_n$—. Polyisobutylene is chemically inert since it has no unsaturated bonds in the molecule, and therefore possesses strong resistance to ozone, acid, alkalis and the like. Polyisobutylene is a semi-solid polymer with high viscosity. Polyisobutylene possesses high adhesiveness and high viscosity. It is estimated that in a case where the composition contains polyisobutylene, a decrease in the degree of viscosity of the composition can be suppressed even if sliding occurs at a high temperature. Consequently, it is estimated that in a case where the composition contains polyisobutylene, under a high interfacial pressure in the final stage of fastening, frictional resistance at a frictional interface of the lubricant coating layer 21 rapidly increases, and the high torque performance is enhanced.

As described above, when the composition contains polyisobutylene, the high torque performance of the threaded connection for pipes is enhanced. Furthermore, when the composition contains polyisobutylene, the galling resistance of the threaded connection for pipes improves to the same level as, or to a higher level than, the galling resistance obtained when using a conventional API standards dope.

The content of polyisobutylene is preferably within the range of 5 to 30%. When the content of polyisobutylene is 5% or more, sufficient high torque performance is stably obtained. Therefore, the lower limit of the polyisobutylene content is preferably 5%, more preferably is 8%, and further preferably is 10%. On the other hand, when the polyisobutylene content is not more than 30%, a decrease in the strength of the lubricant coating layer 21 can be suppressed. If the polyisobutylene content is not more than 25%, an increase in friction is also suppressed and high galling resistance can be maintained. Therefore, the upper limit of the polyisobutylene content in the lubricant coating layer 21 is preferably 30%, and more preferably is 25%.

The average molecular weight (Mv) of the polyisobutylene is preferably 30,000 or more. Therefore, the lower limit of the average molecular weight of the polyisobutylene is preferably 30,000, and more preferably is 50,000. On the other hand, when the average molecular weight of the polyisobutylene is not more than 100,000, the viscosity of the composition is kept within an appropriate range, and productivity increases. Accordingly, the upper limit of the average molecular weight of the polyisobutylene is preferably 100,000, more preferably is 90,000, and further preferably is 70,000.

In the present description, the term "average molecular weight (Mv)" of the polyisobutylene refers to the "viscosity average molecular weight". The viscosity average molecular weight is measured by the following method. The efflux time of a dilution solution of polyisobutylene is measured using a capillary viscometer, and the intrinsic viscosity [η] is determined. The viscosity average molecular weight (Mv) is calculated using the obtained intrinsic viscosity [η] and the Mark-Houwink equation ($[\eta]=KM^a$).

For example, Tetrax (registered trademark) (Grades 3T to 6T) or Himol (Grades 4H to 6H) which are manufactured by JXTG Nippon Oil & Energy Corporation can be used as the polyisobutylene.

[Metal Soap]

The term "metal soap" is a generic term for all metallic salts of fatty acids other than with sodium and potassium. When the composition contains a metal soap, the galling resistance and anti-rust properties of the threaded connection for pipes are enhanced.

The term "fatty acid" is a generic term for saturated or unsaturated chain monocarboxylic acids. The fatty acid is, for example, one or more types selected from the group consisting of lauric acid, tridecylic acid, myristic acid, palmitic acid, lanopalmitic acid, stearic acid, isostearic acid, 12-hydroxystearic acid, oleic acid, elaidic acid, arachic acid, behenic acid, erucic acid, lignoceric acid, lanoceric acid, ricinoleic acid, montanic acid, linoleic acid, linolenic acid, ricinoleic acid, octylic acid and sebacic acid. From the viewpoint of lubricity and anti-rust properties, it is preferable that the fatty acid of the metal soap be a fatty acid having 12 to 30 carbon atoms. The fatty acid having 12 to 30 carbon atoms is, for example, one or more types selected from the group consisting of lauric acid, tridecylic acid, myristic acid, palmitic acid, lanopalmitic acid, stearic acid, isostearic acid, 12-hydroxystearic acid, oleic acid, elaidic acid, arachic acid, behenic acid, erucic acid, lignoceric acid, lanoceric acid, ricinoleic acid, montanic acid, linoleic acid, linolenic acid and ricinoleic acid.

The metal of the metal soap is, for example, one or more types selected from the group consisting of calcium, alkaline earth metals, zinc, aluminum and lithium. The metal is preferably calcium. The salt may be either a neutral salt or a basic salt.

The content of the metal soap in the composition is preferably from 2 to 30%. When the content of the metal soap is 2% or more, the galling resistance and anti-rust properties of the lubricant coating layer 21 can be sufficiently enhanced. When the content is not more than 30%, the adhesiveness and strength of the lubricant coating layer 21 are more stably enhanced. A more preferable lower limit of the content of the metal soap is 4%, and further preferably is 10%. A more preferable upper limit of the content of the metal soap is 19%, and further preferably is 17%.

[Wax]

The term "wax" is a generic name for an organic substance which is solid at normal temperature and becomes liquid when heated. The wax is one or more types selected from the group consisting of animal wax, vegetable wax, mineral wax, and synthetic wax. The animal wax is, for example, one or more types selected from the group consisting of beeswax and spermaceti wax. The vegetable wax is, for example, one or more types selected from the group consisting of Japan wax, carnauba wax, candelilla wax and rice wax. The mineral wax is, for example, one or more types selected from the group consisting of paraffin wax, microcrystalline wax, petrolatum, montan wax, Ozokerite and ceresin. The synthetic wax is, for example, one or more types selected from the group consisting of oxidized wax, polyethylene wax, Fischer-Tropsch wax, amide wax and hydrogenated castor oil (castor wax). As one example, the molecular weight of the wax is not more than 1,000. Preferably, the wax is paraffin wax having a molecular weight of 150 to 500.

The wax reduces the friction and increases the galling resistance of the lubricant coating layer 21. The wax also reduces the flowability of the lubricant coating layer 21, and increases the strength of the lubricant coating layer 21.

The content of the wax in the composition is preferably from 2 to 30%. When the wax content is 2% or more, the aforementioned effects can be sufficiently obtained. When the content is not more than 30%, the adhesiveness and strength of the lubricant coating layer 21 are more stably enhanced. The lower limit of the wax content is more preferably 5%, and further preferably is 10%. The upper limit of the wax content is more preferably 20%, and further preferably is 15%.

[Basic Metal Salt of Aromatic Organic Acid]

The basic metal salt of an aromatic organic acid is a salt constituted by an aromatic organic acid and a surplus alkali (alkali metal or alkaline earth metal). The basic metal salt of an aromatic organic acid, for example, is a substance which is present in a grease form or semisolid form at normal temperature.

When a basic metal salt of an aromatic organic acid is contained in the composition, anticorrosion properties of the lubricant coating layer 21 are significantly increased. In addition, by containing a basic metal salt of an aromatic organic acid in the composition, the galling resistance of the threaded connection for pipes also increases. The reason these effects are obtained is that, because the basic metal salt of an aromatic organic acid is present in a colloidal fine particle state in the lubricant coating layer 21, surplus metal salts are physically absorbed, or chemically absorbed by organic acid groups.

An aromatic organic acid is, for example, one or more types selected from the group consisting of sulfonates, salicylates, phenates and carboxylates.

The alkali that constitutes a cation portion of the basic metal salt of an aromatic organic acid is one or more types of alkali selected from the group consisting of alkali metals and alkaline earth metals. The alkali is preferably one or more types selected from the group consisting of alkaline earth metals. Further preferably, the alkali is one or more types selected from the group consisting of calcium, barium and magnesium.

The higher a base number of the basic metal salt of an aromatic organic acid is, the more an amount of fine particle metal salts which function as a solid lubricant increases. As a result, the galling resistance of the lubricant coating layer 21 increases. Further, when the base number is higher than a certain level, there is an action that neutralizes an acid component. As a result, the anti-rust properties of the lubricant coating layer 21 also increase. Therefore, the basic metal salt of an aromatic organic acid preferably has a base number (JIS K2501 (2003)) of 50 to 500 mg KOH/g (note that, in the case of using two or more types, the term “base number” refers to a weighted average value of base numbers for which an amount is taken into consideration). When the base number is 50 mg KOH/g or more, the aforementioned effects are sufficiently obtained. When the base number is not more than 500 mg KOH/g, hydrophilicity can be decreased and sufficient anti-rust properties are obtained. A further preferable lower limit of the base number of the basic metal salt of an aromatic organic acid is 100 mg KOH/g, and more preferably is 200 mg KOH/g, and most preferably is 250 mg KOH/g. A further preferable upper limit of the base number of the basic metal salt of an aromatic organic acid is 450 mg KOH/g. The base number of the basic metal salt of an aromatic organic acid is measured by a method that conforms to JIS K2501 (2003).

The content of the basic metal salt of an aromatic organic acid is preferably within the range of 10 to 70%. As described above, the basic metal salt of an aromatic organic acid is a substance in a grease form or semisolid form, and can also serve as a base of the lubricant coating layer 21. Therefore, the basic metal salt of an aromatic organic acid can be contained in a large amount of up to 70% in the composition. Accordingly, the upper limit of the content of the basic metal salt of an aromatic organic acid is preferably 70%, more preferably is 60%, and further preferably is 55%. The lower limit of the content of the basic metal salt of an aromatic organic acid is preferably 10%, more preferably 20%, and further preferably 40%.

[Lubricant Powder]

Preferably the composition contains a lubricant powder in order to further increase the lubricity of the lubricant coating layer 21. The term “lubricant powder” is the generic name for solid powders that have lubricity. A powder that is known in the art can be used as the lubricant powder.

Lubricant powders can be broadly categorized into, for example, the following four types. The lubricant powder contains one or more types selected from the group consisting of the following (1) to (4) types of lubricant powder:

(1) Lubricant powders having a particular crystal structure, such as a lamellar hexagonal crystal structure, in which slipping easily occurs and which thereby exhibits lubricity (e.g., graphite, earthy graphite, zinc oxide, boron nitride and talc);

(2) Lubricant powders including a reactive element in addition to a crystal structure and thereby exhibiting lubricity (e.g., molybdenum disulfide, tungsten disulfide, graphite fluoride, tin sulfide, bismuth sulfide and organomolybdenum);

(3) Lubricant powders exhibiting lubricity due to chemical reactivity (e.g., thiosulfate compounds); and (4) Lubricant powders exhibiting lubricity due to plastic or viscoplastic behavior under frictional stresses (e.g., polytetrafluoroethylene (PTFE), polyamide, copper (Cu), and melamine cyanurate (MCA)).

Preferably, the lubricant powder contains one or more types selected from the group consisting of the aforementioned (1) to (4) types. That is, preferably the lubricant powder is one or more types selected from the group consisting of graphite, earthy graphite, zinc oxide, boron nitride, talc, molybdenum disulfide, tungsten disulfide, graphite fluoride, tin sulfide, bismuth sulfide, organomolybdenum, thiosulfate compounds, polytetrafluoroethylene (PTFE), polyamide, copper (Cu) and melamine cyanurate (MCA). More preferably, the lubricant powder is one or more types selected from the group consisting of molybdenum disulfide, graphite, polytetrafluoroethylene (PTFE) and graphite fluoride. Further preferably, the lubricant powder is one or more types selected from the group consisting of graphite and polytetrafluoroethylene (PTFE). From the standpoint of the adhesiveness and anti-rust properties of the lubricant coating layer 21, the lubricant powder is preferably graphite, while from the standpoint of film forming properties, the lubricant powder is preferably earthy graphite. From the standpoint of lubricity, the lubricant powder is preferably polytetrafluoroethylene (PTFE).

The content of the lubricant powder in the composition is preferably within the range of 0.5 to 20%. When the content of the lubricant powder is 0.5% or more, the galling resistance of the threaded connection for pipes is further enhanced.

Therefore, the number of operations of fastening and loosening that can be performed before galling occurs increases. On the other hand, when the content of the lubricant powder is not more than 20%, the strength of the lubricant coating layer 21 increases further. As a result, wear of the lubricant coating layer 21 is inhibited. Accordingly, the upper limit of the content of the lubricant powder is preferably 20%, more preferably is 15%, and further preferably is 10%. The lower limit of the content of the lubricant powder is preferably 0.5%, more preferably is 3%, and further preferably is 5%.

[Volatile Organic Solvent]

The composition may contain a volatile organic solvent. In the case of performing the application at normal temperature, the composition is prepared by adding a volatile organic solvent to the mixture of the components of the lubricant coating layer 21. Unlike other substances contained in the composition, the volatile organic solvent evaporates during a lubricant coating layer formation step. Therefore, usually the volatile organic solvent does not substantially remain in the lubricant coating layer 21. However, the lubricant coating layer 21 of the present embodiment may be a viscous liquid or semisolid, and hence there are cases where a volatile organic solvent in an amount of, for example, 1% or less remains in the lubricant coating layer 21. The term “volatile” means that there is a tendency for the organic solvent to evaporate in a coating state at a temperature within the range of room temperature to 150° C.

The type of the volatile organic solvent is not particularly limited. For example, the volatile organic solvent is a petroleum solvent. The petroleum solvent is, for example, one or more types of solvent selected from the group consisting of a solvent corresponding to industrial gasoline defined by JIS K 2201 (2006), mineral spirit, aromatic petroleum naphtha, xylene, and Cellosolve.

A volatile organic solvent having a flash point of 30° C. or more, an initial boiling point of 150° C. or more, and a final boiling point of not more than 210° C. is preferable. In this case, the volatile organic solvent is relatively easy to handle, and also evaporates rapidly, and thus the drying time is short.

The content of the volatile organic solvent may be appropriately adjusted so that the composition can be adjusted to an appropriate viscosity according to the method used to apply the composition. The content of the volatile organic solvent is, for example, 20 to 50 g when the total amount of non-volatile components is taken as 100 g.

[Other Components]

The composition may also contain an anti-rust addition agent, an antiseptic agent, a coloring pigment or the like that are known in the art.

[Anti-Rust Addition Agent]

It is preferable for the lubricant coating layer 21 to have anti-rust properties over an extended period of time until being actually used. For this reason, the composition may contain an anti-rust addition agent. The term “anti-rust addition agent” is a generic term for addition agents that have corrosion resistance. The anti-rust addition agent is, for example, one or more types selected from the group consisting of aluminum tripolyphosphate, aluminum phosphite, and calcium ion-exchanged silica. Preferably, the anti-rust addition agent contains one or more types of addition agent selected from the group consisting of calcium ion-exchanged silica and aluminum phosphite. Other examples of the anti-rust addition agent that can be used include a commercially available reactive water repellent agent.

[Antiseptic Agent]

The lubricant coating layer 21 may further contain an antiseptic agent. The term “antiseptic agent” is a generic term for addition agents that have corrosion resistance.

The content of the other components (anti-rust addition agent, antiseptic agent and coloring pigment or the like) in the composition is preferably within the range of 2 to 10 mass % in total. When the total content of the other components is 2% or more, the anti-rust properties of the lubricant coating layer 21 are further stably enhanced. When the total content of the other components is not more than 10 mass %, the lubricity of the lubricant coating layer 21 stably increases.

The composition for forming the lubricant coating layer 21 can be produced by mixing together the aforementioned polyisobutylene, metal soap, wax, basic metal salt of an aromatic organic acid and other components. By applying the composition onto at least one of the pin-side contact surface 34 and the box-side contact surface 44 of the threaded connection for pipes and thereafter drying the composition, the threaded connection for pipes of the present embodiment that has the lubricant coating layer 21 can be produced.

[Thickness of Lubricant Coating Layer]

The thickness of the lubricant coating layer 21 is preferably 10 to 40 μm. When the thickness of the lubricant coating layer 21 is 10 μm or more, a high lubricity can be stably obtained. On the other hand, when the thickness of the lubricant coating layer 21 is not more than 40 μm, the adhesiveness of the lubricant coating layer 21 is stable. Furthermore, when the thickness of the lubricant coating layer 21 is not more than 40 μm, because the thread tolerance (clearance) of the sliding surfaces widens, interfacial pressure during sliding becomes lower. Therefore, the fastening torque can be inhibited from becoming excessively high. Accordingly, the thickness of the lubricant coating layer 21 is preferably 10 to 40 μm.

The thickness of the lubricant coating layer 21 is measured by the following method. The lubricant coating layer 21 is wiped off from an arbitrary measurement location (area: 5 mm×20 mm) on the pin-side contact surface 34 or the box-side contact surface 44 of the threaded connection for pipes using absorbent cotton soaked with ethanol. The weight of the lubricant coating layer 21 is then calculated based on a difference between the weight of the absorbent cotton prior to wiping off the lubricant coating layer 21 and the weight of the absorbent cotton after wiping. The average thickness of the lubricant coating layer 21 is calculated based on the weight of the lubricant coating layer 21 that was wiped off, the density of the lubricant coating layer 21, and the area of the measurement location.

[Location of Lubricant Coating Layer]

Figure 10:
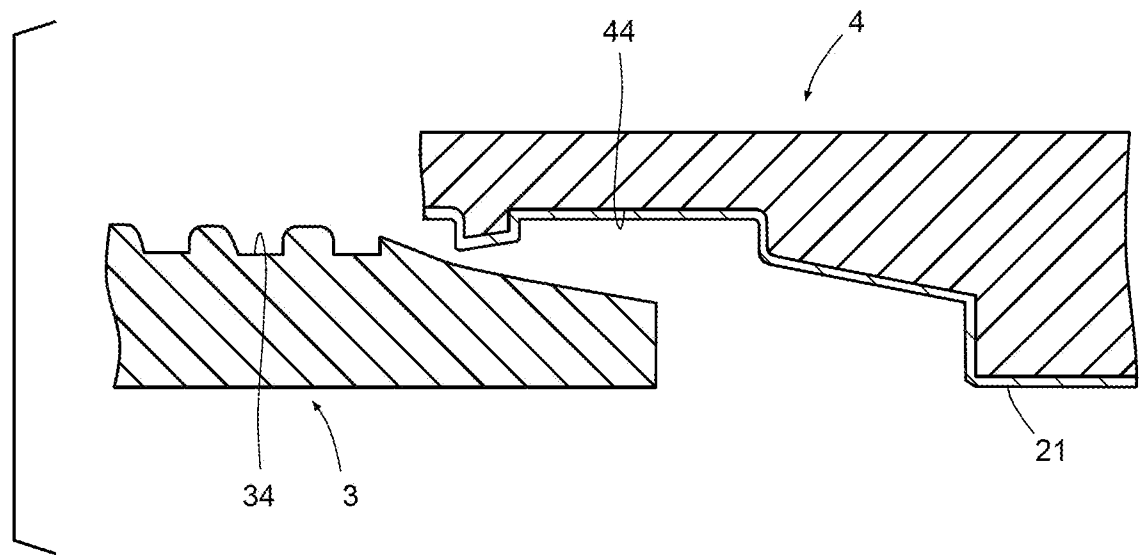
FIG. 10 is a cross-sectional view of a threaded connection for pipes according to another embodiment, which is different from FIG. 9.
Figure 11:
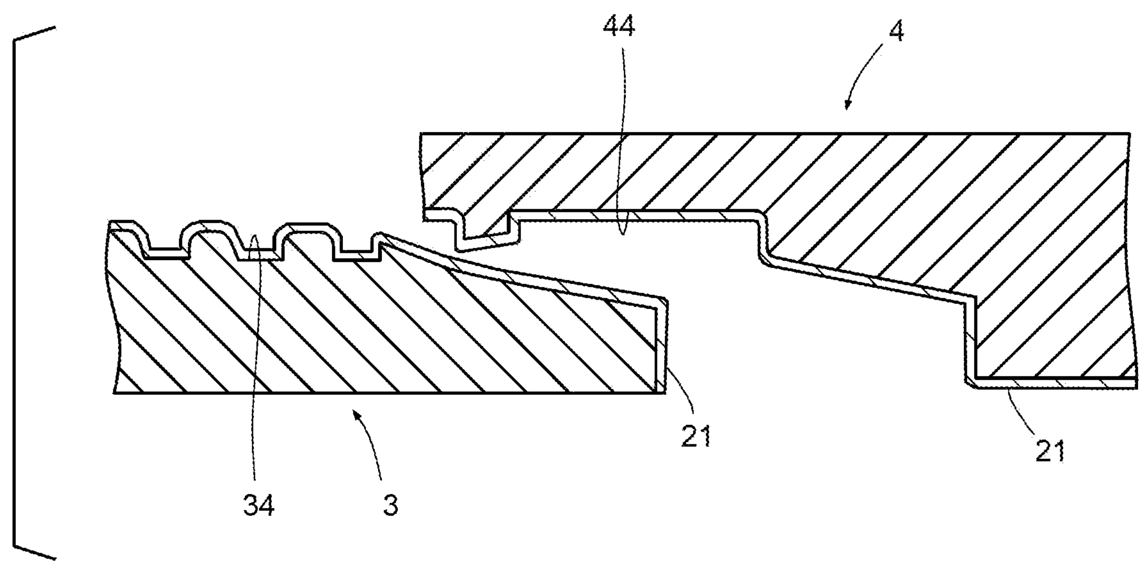
FIG. 11 is a cross-sectional view of a threaded connection for pipes according to another embodiment, which is different from FIG. 9 and FIG. 10.

The lubricant coating layer 21 is formed as the outermost layer on or above at least one of the pin-side contact surface 34 and the box-side contact surface 44. As illustrated in FIG. 9, the lubricant coating layer 21 may be formed on only the pin-side contact surface 34. As illustrated in FIG. 10, the lubricant coating layer 21 may be formed on only the box-side contact surface 44. As illustrated in FIG. 11, the lubricant coating layer 21 may be formed on or above both the pin-side contact surface 34 and the box-side contact surface 44.

Further, the lubricant coating layer 21 may be formed on or above all of at least one of the pin-side contact surface 34 and the box-side contact surface 44, or may be formed on only one part of at least one of the pin-side contact surface 34 and the box-side contact surface 44. In a case where the threaded connection for pipes has metal seal portions (pin-side metal seal portion 32 and box-side metal seal portion 42) and shoulder portions (pin-side shoulder portion 33 and box-side shoulder portion 43), the interfacial pressure at the metal seal portions 32 and 42 and the shoulder portions 33 and 43 increases, in particular, in the final stage of fastening. Accordingly, in a case where the lubricant coating layer 21 is partially formed on or above at least one of the pin-side contact surface 34 and the box-side contact surface 44 that have metal seal portions (pin-side metal seal portion 32 and box-side metal seal portion 42) and shoulder portions (pin-side shoulder portion 33 and box-side shoulder portion 43), the lubricant coating layer 21 may be formed at least at one location of the pin-side metal seal portion 32, the box-side metal seal portion 42, the pin-side shoulder portion 33 and the box-side shoulder portion 43. On the other hand, when the lubricant coating layer 21 is formed on or above all of at least one of the pin-side contact surface 34 and the box-side contact surface 44, the production efficiency with respect to the threaded connection for pipes increases.

The lubricant coating layer 21 may be formed of a single layer or multiple layers. The term "multiple layers" refers to a state in which two or more layers of the lubricant coating layer 21 are deposited from the contact surface 34 or 44 side. The two or more layers of the lubricant coating layer 21 can be formed by repeating application and drying of the composition. When the lubricant coating layer 21 is to be formed as the outermost layer on or above at least one of the pin-side contact surface 34 and the box-side contact surface 44, the lubricant coating layer 21 may be formed directly on at least one of the pin-side contact surface 34 and the box-side contact surface 44, or may be formed thereon after forming a plating layer or/and a chemical conversion treatment layer that are described later.

[Plating Layer]

Preferably the threaded connection for pipes of the present embodiment further includes a plating layer between the pin-side contact surface 34 and the lubricant coating layer 21, or/and between the box-side contact surface 44 and the lubricant coating layer 21. The plating layer is, for example, a single plating layer that includes Cu. Sn, or Ni metal, a single plating layer that includes a Cu—Sn alloy, a single plating layer that includes a Zn—Co alloy, a single plating layer that includes a Zn—Ni alloy, a single plating layer that includes a Cu—Sn—Zn alloy, plating with two layers including a Cu layer and an Sn layer, or plating with three layers including an Ni layer, a Cu layer, and an Sn layer.

The hardness of the plating layer is preferably a micro-Vickers hardness of 300 or more. When the hardness of the plating layer is 300 or more, there is a further stable increase in the corrosion resistance of the threaded connection for pipes.

The hardness of the plating layer is measured as follows. Five arbitrary regions are selected in the plating layer of the threaded connection for pipes. The Vickers hardness (HV) in each of the selected regions is measured in accordance with JIS Z 2244 (2009). The test conditions are a test temperature of normal temperature (25° C.) and a test force of 2.94 N (300 gf). The mean of the obtained values (from a total of 5 places) is defined as the hardness of the plating layer.

In the case of a multi-layer plating layer such as plating with two layers including a Cu layer and an Sn layer, or plating with three layers including an Ni layer, a Cu layer, and an Sn layer, the thickness of the undermost layer of plating is preferably less than 1 μm. The thickness of the plating layer (total thickness of plating layers in the case of multi-layer plating) is preferably in the range of 5 to 15 μm.

The thickness of the plating layer is measured as follows. A probe of an eddy current phase-type film thickness measuring instrument conforming to ISO (International Organization for Standardization) 21968 (2005) is brought into contact with the surface of the plating layer. A phase difference between a high-frequency magnetic field on the input side of the probe and an eddy current on the plating layer that was excited by the high-frequency magnetic field is measured. The phase difference is converted to a thickness of the plating layer.

[Chemical Conversion Treatment Layer]

Preferably the threaded connection for pipes of the present embodiment includes a chemical conversion treatment layer between the lubricant coating layer 21 and a plating layer. In a case where the threaded connection for pipes includes a plating layer on only the pin-side contact surface 34, the chemical conversion treatment layer is provided between the plating layer on the pin-side contact surface 34 and the lubricant coating layer 21. In a case where the threaded connection for pipes includes a plating layer on only the box-side contact surface 44, the chemical conversion treatment layer is provided between the plating layer on the box-side contact surface 44 and the lubricant coating layer 21. In a case where the threaded connection for pipes includes a plating layer both on the pin-side contact surface 34 and on the box-side contact surface 44, the chemical conversion treatment layer is provided at least between the plating layer on the pin-side contact surface 34 and the lubricant coating layer 21 or between the plating layer on the box-side contact surface 44 and the lubricant coating layer 21.

The chemical conversion treatment layer is, for example, a phosphate chemical conversion treatment layer, an oxalate chemical conversion treatment layer and a borate chemical conversion treatment layer. The chemical conversion treatment layer is porous. Thus, when the lubricant coating layer 21 is formed on the chemical conversion treatment layer, the so-called "anchoring effect" is produced and, as a result, the adhesiveness of the lubricant coating layer 21 is further enhanced. The thickness of the chemical conversion treatment layer is preferably in the range of 5 to 40 μm. When the thickness of the chemical conversion treatment layer is not less than 5 μm, sufficient corrosion resistance can be ensured. When the thickness of the chemical conversion treatment layer is not greater than 40 μm, the lubricant coating layer 21 exhibits consistently high adhesiveness.

The thickness of the chemical conversion treatment layer is determined by the following method. The threaded connection for pipes on which the chemical conversion treatment layer has been formed is cut in the direction of the thickness of the chemical conversion treatment layer (perpendicularly to the axial direction of the threaded connection for pipes). The cross-section of the chemical conversion treatment layer is observed at a magnification of ×500 using an optical microscope, and the thickness of the chemical conversion treatment layer is measured. In a case where the thickness of the chemical conversion treatment layer that was measured by the aforementioned measurement method is not more than 10 μm, the threaded connection for pipes is cut again and the thickness of the chemical conversion treatment layer is re-measured. In this case, the threaded connection for pipes is cut in a direction that is inclined by 60° from the perpendicular direction to the axial direction of the threaded connection for pipes. The obtained cross-section of the chemical conversion treatment layer is observed at a magnification of ×500 using an optical microscope, and the thickness of the chemical conversion treatment layer is measured. In the case where the thickness of the chemical conversion treatment layer is re-measured, the re-measured thickness is adopted as the thickness of the chemical conversion treatment layer.

[Blasting Treatment or Pickling]

In the threaded connection for pipes of the present embodiment, the surface which is below the lubricant coating layer 21 and which contacts the lubricant coating layer 21 may be a surface that is subjected to a blasting treatment or pickling. The term "surface which is below the lubricant coating layer 21 and which contacts the lubricant coating layer 21" refers to the pin-side contact surface 34 in a case where the threaded connection for pipes does not include a plating layer on the pin-side contact surface 34 (that is, a case where the lubricant coating layer 21 was formed directly on the pin-side contact surface 34), and refers to the plating layer surface in a case where the threaded connection for pipes includes a plating layer on the pin-side contact surface 34. The term "surface which is below the lubricant coating layer 21 and which contacts the lubricant coating layer 21" refers to the box-side contact surface 44 in a case where the threaded connection for pipes does not include a plating layer on the box-side contact surface 44 (that is, a case where the lubricant coating layer 21 was formed directly on the box-side contact surface 44), and refers to the plating layer surface in a case where the threaded connection for pipes includes a plating layer on the box-side contact surface 44.

The surface roughness of a surface that is subjected to a blasting treatment or pickling increases. More specifically, in a case where the pin-side contact surface 34, the box-side contact surface 44 or the plating layer surface is subjected to a blasting treatment or pickling, the surface roughness of the pin-side contact surface 34, the box-side contact surface 44 or the plating layer surface is high. In this case, the adhesiveness of the lubricant coating layer 21 that is formed on or above the relevant surface increases further. The arithmetic mean roughness Ra of the surface roughness is preferably within the range of 1.0 to 8.0 μm. The greater the arithmetic mean roughness Ra is, the larger the contact area with the lubricant coating layer 21 becomes. Therefore, the adhesiveness with respect to the lubricant coating layer 21 increases because of the anchoring effect. When the adhesiveness of the lubricant coating layer 21 increases, the galling resistance of the threaded connection for pipes is further enhanced. When the arithmetic mean roughness Ra is not less than 1.0 μm, the lubricant coating layer 21 exhibits further enhanced adhesiveness. When the arithmetic mean roughness Ra is not more than 8.0 μm, friction is inhibited and therefore damage and delamination of the lubricant coating layer 21 is inhibited.

The arithmetic mean roughness Ra referred to in the present description is measured based on JIS B 0601 (2001). The arithmetic mean roughness Ra is measured using a scanning probe microscope (SPI 3800N, manufactured by SII NanoTechnology Inc.). The measurement conditions are: a number of acquired data points of 1024×1024 in sample regions of 2 μm×2 μm. The sampling length is 2.5 mm.

[Location of Lubricant Coating Layer, Plating Layer and Chemical Conversion Treatment Layer]

As long as the lubricant coating layer 21 is formed on or above at least one of the pin-side contact surface 34 and the box-side contact surface 44, the location of the plating layer and the chemical conversion treatment layer is not particularly limited. A case where the threaded connection for pipes includes only the lubricant coating layer 21 will be taken as "pattern 1". A case where the threaded connection for pipes includes the lubricant coating layer 21, and includes a plating layer under the lubricant coating layer 21 will be taken as "pattern 2". A case where the threaded connection for pipes includes the lubricant coating layer 21, and includes a chemical conversion treatment layer under the lubricant coating layer 21 will be taken as "pattern 3". A case where the threaded connection for pipes includes the lubricant coating layer 21, and includes a chemical conversion treatment layer and a plating layer under the lubricant coating layer 21 will be taken as "pattern 4". A case where the threaded connection for pipes does not include the lubricant coating layer 21 will be taken as "pattern 5". When the aforementioned conditions are satisfied, it is possible for any of the patterns 1 to 5 to apply with respect to the pin-side contact surface 34 and the box-side contact surface 44. Specifically, in a case where any one of pattern 1 to pattern 4 apply to the pin-side contact surface 34, any one of pattern 1 to pattern 5 may apply to the box-side contact surface 44. Further, in a case where pattern 5 applies to the pin-side contact surface 34, any one of pattern 1 to pattern 4 applies to the box-side contact surface 44. Conversely, in a case where any one of pattern 1 to pattern 4 apply to the box-side contact surface 44, any one of pattern 1 to pattern 5 may apply to the pin-side contact surface 34. Further, in a case where pattern 5 applies to the box-side contact surface 44, any one of pattern 1 to pattern 4 applies to the pin-side contact surface 34. In any of the patterns, the pin-side contact surface 34, the box-side contact surface 44 and the plating layer surface can be a surface that is subjected to a blasting treatment or pickling as appropriate.

[Base Metal of Threaded Connection for Pipes]

The composition of the base metal of the threaded connection for pipes is not particularly limited. Examples of the base metal include carbon steels, stainless steels and alloy steels. Among alloy steels, high alloy steels such as duplex stainless steels that contain alloying elements such as Cr, Ni and Mo and an Ni alloy have high corrosion resistance. Therefore by using these high alloy steels as a base metal, excellent corrosion resistance is obtained in a corrosive environment that contains hydrogen sulfide or carbon dioxide or the like.

[Production Method]

A method for producing the threaded connection for pipes according to the present embodiment is described hereunder.

The method for producing the threaded connection for pipes according to the present embodiment includes a lubricant coating layer formation step of using the composition of the present embodiment to form the lubricant coating layer 21 on or above at least one of the pin-side contact surface 34 and the box-side contact surface 44.

[Lubricant Coating Layer Formation Step]

In the lubricant coating layer formation step, a mixture of the constituent components of the composition described above is liquified by solvent addition and/or heating, and the liquid mixture is applied onto at least one of the pin-side contact surface 34 and the box-side contact surface 44. The composition that was applied onto at least one of the pin-side contact surface 34 and the box-side contact surface 44 is dried as necessary, to thereby form the lubricant coating layer 21. There are no restrictions regarding the states of the lubricant coating layer 21. The states of the lubricant coating layer 21 include, for example, solid, viscous liquid or semisolid.

Firstly, the composition is prepared. The solventless type composition may be prepared, for example, by heating a mixture of polyisobutylene, a metal soap, a wax and a basic metal salt of an aromatic organic acid to a molten state, and kneading these components. The composition may be made of a powder mixture prepared by mixing all the components in powder form.

The solvent-based composition can be prepared, for example, by dissolving or dispersing the polyisobutylene, metal soap, wax and basic metal salt of an aromatic organic acid in a volatile organic solvent and mixing them.

For the solventless type composition, a hot melt process may be employed to apply the composition. In the hot melt process, the composition is heated to be melted to a fluid state with low viscosity. The composition in a fluid state can be sprayed from a spray gun having functions for temperature holding. The composition is heated and melted within a tank including a suitable stirring mechanism, is supplied via a metering pump to the spray head (held at a predetermined temperature) of the spray gun by a compressor, and is sprayed. The heating temperature is, for example, in a range of 90 to 130° C. The holding temperatures for the tank interior and the spray head are adjusted in accordance with the melting point of the constituent components of the composition. Another application method, such as brushing or dipping, may be employed in place of spray coating. The temperature to which the composition is heated is preferably higher than the melting point of the composition by 10 to 50° C. Prior to application of the composition, at least one of the pin-side contact surface 34 and the box-side contact surface 44 to which the composition is to be applied is preferably heated to a temperature higher than the melting point of the base. This makes it possible to achieve good coating properties.

In the case of the solvent-based composition, the composition in solution form is applied onto the contact surface by spray coating or by another method. In this case, preferably the viscosity of the composition is adjusted so that the composition can be applied by spray coating in an environment at normal temperature and normal pressure.

In the case of the solventless type composition, the lubricant coating layer 21 is formed by cooling the composition that was applied on or above at least one of the pin-side contact surface 34 and the box-side contact surface 44 to allow the composition in a molten state to dry. The cooling process can be carried out by a well-known method. Examples of the cooling process include natural cooling and air cooling.

In the case of the solvent-based composition, the lubricant coating layer 21 is formed by drying the composition that was applied on or above at least one of the pin-side contact surface 34 and the box-side contact surface 44. The drying process can be carried out by a well-known method. Examples of the drying process include natural drying, low-temperature air drying, and vacuum drying.

The cooling may be carried out by rapid cooling using, for example, a nitrogen gas cooling system or a carbon dioxide cooling system. In the case where rapid cooling is performed, the cooling is carried out in an indirect manner from the opposite surface to the pin-side contact surface 34 or/and the box-side contact surface 44 onto which the composition was applied (in the case of the box 4, at the outer surface of the steel pipe 1 or the coupling 2, and in the case of the pin 3, at the inner surface of the steel pipe 1). By this means, degradation of the lubricant coating layer 21 that may be caused by rapid cooling can be inhibited.

The production method of the present embodiment may include the following steps before the lubricant coating layer formation step.

[Plating Layer Formation Step]

The method for producing the threaded connection for pipes according to the present embodiment may include a plating layer formation step before the lubricant coating layer formation step. The plating layer can be formed, for example, by an electroplating treatment or an impact plating treatment.

[Electroplating Treatment]

The electroplating treatment is, for example, a treatment that forms a plating layer by electroplating. In the case of forming a plating layer, in the electroplating treatment, a Zn alloy plating layer may be formed by an electroplating treatment on at least one of the pin-side contact surface 34 and the box-side contact surface 44. Alternatively, in the electroplating treatment, a Zn alloy plating layer may be formed by an electroplating treatment after roughening at least one of the pin-side contact surface 34 and the box-side contact surface 44 by performing a blasting treatment or pickling.

By performing the electroplating treatment, the galling resistance and corrosion resistance of the threaded connection for pipes are increased. In the case of forming a plating layer, examples of the electroplating treatment step include: a treatment of applying a single layer of plating using Cu, Sn, or Ni metal; a treatment of applying a single layer of plating including a Cu—Sn alloy; a treatment of applying a single layer of plating including a Zn—Co alloy; a treatment of applying a single layer of plating including a Zn—Ni alloy; a treatment of applying a single layer of plating including a Cu—Sn—Zn alloy: a treatment of applying a two-layer plating including a Cu layer and an Sn layer; and a treatment of applying a three-layer plating including an Ni layer, a Cu layer, and an Sn layer. For the steel pipe 1 formed from a steel having a Cr content of 5% or more, preferred treatments are a Cu—Sn alloy plating treatment, a two-layer plating treatment in which a Cu plating and an Sn plating are applied, and a three-layer plating treatment in which an Ni plating, a Cu plating, and an Sn plating are applied.

The electroplating treatment can be carried out by a well-known method. For example, a plating bath including ions of the metal elements to be contained in the plating layer is prepared. Next, at least one of the pin-side contact surface 34 and the box-side contact surface 44 is immersed in the plating bath. A current is then conducted through the pin-side contact surface 34 or/and the box-side contact surface 44 that is immersed in the plating bath, to thereby form a plating layer on at least one of the pin-side contact surface 34 and the box-side contact surface 44. The treatment conditions including the temperature of the plating bath and the duration of the plating treatment can be set appropriately.

More specifically, for example, in the case of forming a Cu—Sn—Zn alloy plating layer, the plating bath contains copper ions, tin ions and zinc ions. The composition of the plating bath is preferably Cu: 1 to 50 g/L, Sn: 1 to 50 g/L and Zn: 1 to 50 g/L. The electroplating conditions are, for example, a plating bath pH of 1 to 10, a plating bath temperature of 60° C., a current density of 1 to 100 $A/dm^2$ and a treatment time of 0.1 to 30 minutes.

In the case of forming a Zn—Ni alloy plating layer, the plating bath contains zinc ions and nickel ions. The composition of the plating bath is preferably Zn: 1 to 100 g/L and Ni: 1 to 50 g/L. The electroplating conditions are, for example, a plating bath pH of 1 to 10, a plating bath temperature of 60° C., a current density of 1 to 100 A/dm$^2$ and a treatment time of 0.1 to 30 minutes.

[Impact Plating Treatment]

An impact plating treatment is a treatment that can be performed by mechanical plating in which particles are allowed to collide with a material to be plated inside a rotating barrel, or by projection plating in which particles are caused to collide against a material to be plated using a blasting apparatus.

In the method for producing a threaded connection for pipes according to the present embodiment, the surface that contacts the lubricant coating layer 21 may be subjected to a blasting treatment or pickling. Surface roughness can be formed by the blasting treatment or pickling. The phrase "surface that contacts the lubricant coating layer 21" refers to the pin-side contact surface 34 in a case where a plating layer is not provided on the pin-side contact surface 34, and refers to the plating layer in a case where a plating layer is provided on the pin-side contact surface 34. The phrase "surface that contacts the lubricant coating layer 21" refers to the box-side contact surface 44 in a case where a plating layer is not provided on the box-side contact surface 44, and refers to the plating layer in a case where a plating layer is provided on the box-side contact surface 44.

[Blasting Treatment]

The blasting treatment is, for example, a treatment in which a blasting apparatus is used to cause particles to collide against a material to be plated. The blasting treatment is, for example, a sand blasting treatment. The sand blasting treatment is a treatment in which a blast material (an abrasive) is mixed with compressed air and the mixture is propelled onto the contact surfaces 34, 44. Examples of the blast material include spherical shot material and angular grit material. The surface roughness of the pin-side contact surface 34, the box-side contact surface 44 or the plating layer can be increased by the sand blasting treatment. The sand blasting treatment can be carried out by a well-known method. For example, air is compressed by a compressor, and a blast material is mixed with the compressed air. The material used as the blast material is, for example, stainless steel, aluminum, ceramic, or alumina. The conditions such as propelling speed of the sand blasting treatment can be set appropriately.

[Pickling Treatment]

The pickling treatment is a treatment in which at least one of the pin-side contact surface 34 and the box-side contact surface 44 is immersed in a solution of a strong acid such as sulfuric acid, hydrochloric acid, nitric acid, or hydrofluoric acid to thereby roughen the contact surface 34 or 44. By this means, the surface roughness of the contact surface 34 or 44 can be increased.

[Chemical Conversion Treatment]

The method for producing a threaded connection for pipes according to the present embodiment may include a chemical conversion treatment step before the lubricant coating layer formation step. The chemical conversion treatment is a treatment that forms a porous chemical conversion treatment layer having a high surface roughness. Examples of the chemical conversion treatment include a phosphate chemical conversion treatment, an oxalate chemical conversion treatment, and a borate chemical conversion treatment. From the standpoint of the adhesiveness of the lubricant coating layer 21, a phosphate chemical conversion treatment is preferred. The phosphate chemical conversion treatment is, for example, a phosphate chemical conversion treatment using manganese phosphate, zinc phosphate, manganese iron phosphate, or calcium zinc phosphate.

The chemical conversion treatment can be carried out by a well-known method. The treatment solution may be a common acidic solution for phosphate chemical conversion treatment for zinc-plated products. A solution for zinc phosphate chemical conversion treatment containing 1 to 150 g/L of phosphate ions, 3 to 70 g/L of zinc ions, 1 to 100 g/L of nitrate ions, and 0 to 30 g/L of nickel ions can be mentioned as an example of the solution. Solutions for manganese phosphate chemical conversion treatments which are conventionally used for a threaded connection for pipes can also be used. The temperature of the solution is in the range of normal temperature to 100° C., for example. The treatment time can be appropriately set depending on the desired thickness of the layer and, for example, may be 15 minutes. To promote the formation of the chemical conversion treatment layer, surface modification may be performed prior to the chemical conversion treatment. The term "surface modification" refers to a treatment that includes immersion in a surface modification aqueous solution containing colloidal titanium. After the chemical conversion treatment, it is preferable to perform rinsing with water or with warm water before drying.

Although in the above example only one kind of treatment is performed prior to formation of the lubricant coating layer, a plurality of the treatments may also be performed in combination.

With regard to the treatment(s) performed prior to formation of the lubricant coating layer, the pin 3 and the box 4 may be subjected to the same treatment(s) or the pin 3 and the box 4 may be subjected to different treatments.

Example

An example of the present disclosure will be described below. It should be noted that the present disclosure is not limited to the example. In the example, the pin-side contact surface is referred to as the pin surface and the box-side contact surface is referred to as the box surface. Unless otherwise specified, percent in the example means mass percent.

In the present example, VAM21 (registered trademark) manufactured by NIPPON STEEL CORPORATION were used as a threaded connection for pipes. VAM21 (registered trademark) is a threaded connection for pipes having an outside diameter of 177.80 mm (7 inches) and a wall thickness of 11.506 mm (0.453 inches). The steel grade was carbon steel. The carbon steel had a composition, C: 0.24%, Si: 0.23%, Mn: 0.7%. P: 0.02%, S: 0.01%, Cu: 0.04%. Ni: 0.05%, Cr: 0.95%, Mo: 0.15%, and the balance: Fe and impurities.

A surface preparation treatment was performed on the pin surface and the box surface as shown in Table 1. The numbers in the "Surface Preparation Treatment" column in Table 1 show the order in which the surface preparation treatment was performed. For example, in the case of "1. Finish grinding, 2. Zinc phosphate", finish grinding was performed, and thereafter a zinc phosphate chemical conversion treatment was performed. In a sand blasting process, abrasive grain of 100 mesh was used, and surface roughness was formed. The arithmetic mean roughness Ra for each test number was as shown in Table 1. The arithmetic mean roughness Ra was measured based on JIS B 0601 (2013). Measurement of the arithmetic mean roughness Ra was performed using a scanning probe microscope (SPI 3800N, manufactured by SII NanoTechnology Inc.). The measurement conditions were the number of acquired data points of 1024×1024 in sample regions of 2 μm×2 μm as a unit of acquired data. The thickness of the Zn—Ni alloy was measured by the aforementioned measurement method.

TABLE 1

| | Pin | | Box | |
|---|---|---|---|---|
| Test No. | Surface Preparation Treatment | Arithmetic Surface Roughness Ra (μm) | Surface Preparation Treatment | Arithmetic Surface Roughness Ra (μm) |
| 1 | 1. Finish Grinding | 0.3 | 1. Finish Grinding | 0.3 |
| 2 | 1. Finish Grinding<br>2. Zinc Phosphate | 0.3<br>1.0 | 1. Finish Grinding<br>2. Manganese Phosphate | 0.3<br>1.2 |
| 3 | 1. Finish Grinding<br>2. Zinc Phosphate | 0.3<br>1.0 | 1. Finish Grinding<br>2. Manganese Phosphate | 0.3<br>1.2 |
| 4 | 1. Finish Grinding<br>2. Zinc Phosphate | 0.3<br>1.0 | 1. Finish Grinding<br>2. Manganese Phosphate | 0.3<br>1.2 |
| 5 | 1. Finish Grinding<br>2. Zinc Phosphate | 0.3<br>1.0 | 1. Finish Grinding<br>2. Zn—Ni Plating (coating thickness: 8.0 μm) | 0.3<br>0.5 |
| 6 | 1. Finish Grinding<br>2. Sand Blasting | 0.3<br>1.8 | 1. Finish Grinding<br>2. Sand Blasting | 0.3<br>1.8 |
| 7 | 1. Finish Grinding<br>2. Sand Blasting | 0.3<br>1.8 | 1. Finish Grinding<br>2. Sand Blasting | 0.3<br>1.8 |
| 8 | 1. Finish Grinding<br>2. Zinc Phosphate | 0.3<br>1.0 | 1. Finish Grinding<br>2. Manganese Phosphate | 0.3<br>1.2 |
| 9 | 1. Finish Grinding<br>2. Zinc Phosphate | 0.3<br>1.0 | 1. Finish Grinding<br>2. Manganese Phosphate | 0.3<br>1.3 |
| 10 | 1. Finish Grinding<br>2. Zinc Phosphate | 0.3<br>1.0 | 1. Finish Grinding<br>2. Manganese Phosphate | 0.3<br>1.3 |
| 11 | 1. Finish Grinding<br>2. Zinc Phosphate | 0.3<br>1.0 | 1. Finish Grinding<br>2. Manganese Phosphate | 0.3<br>1.3 |
| 12 | 1. Finish Grinding<br>2. Zinc Phosphate | 0.3<br>1.0 | 1. Finish Grinding<br>2. Manganese Phosphate | 0.3<br>1.3 |

Thereafter, a pin and a box were prepared for each test number with lubricant coating layers were formed using the respective compositions having the chemical compositions shown in Table 2. In brackets in the column for "Non-volatile Components of Composition" in Table 2, the content in percent by mass that is based on the total amount of the non-volatile components of the composition is shown. The following products which were manufactured by JXTG Nippon Oil & Energy Corporation were used as the polyisobutylene: Tetrax (registered trademark) Grade 3T (average molecular weight 30000), Tetrax (registered trademark) Grade 4T (average molecular weight 40000). Tetrax (registered trademark) Grade 5T (average molecular weight 50000), and Tetrax (registered trademark) Grade 6T (average molecular weight 60000). Ca-stearate (trade name) manufactured by DIC Corporation was used as the metal soap. Paraffin Wax (trade name) manufactured by Nippon Seiro Co., Ltd. was used as the wax. As a basic metal salt of an aromatic organic acid, Calcinate (trade name) C400CLR (base number: 400 mg KOH/g) manufactured by Chemtura Corporation was used as a basic Ca sulfonate. In the case of using graphite as a lubricant powder, a graphite powder "Blue P" (trade name) (ash content: 3.79%, crystallinity: 96.9%, average particle size: 7 μm) manufactured by Nippon Graphite Industries, Co., Ltd. was used. In the case of using PTFE as a lubricant powder, Lubron (registered trademark) L-5F manufactured by Daikin Industries, Ltd. was used. As a volatile organic solvent, Exxsol (trade name) D40 manufactured by Exxon Mobil Corporation was used. The volatile organic solvent is shown as an organic solvent in Table 2. Note that, in Test No. 12, a compound grease defined in API standards BUL 5A2 was used instead of a composition. The example in which the compound grease was used was adopted as a reference for high torque performance that is described later.

TABLE 2

| | Non-volatile Components of Composition (numerical value in parentheses shows the content in mass %) | | | | | Organic Solvent | |
|---|---|---|---|---|---|---|---|
| Test No. | Polyisobutylene Average Molecular Weight | Metal Soap | Wax | Basic Metal Salt of Aromatic Organic Acid | Lubricant Powder | (per total amount of 100 g of non-volatile components) | Application Method |
| 1 | 600000 (5) | Stearic Acid Ca (15) | Paraffin Wax (20) | Basic Ca Sulfonate (60) | None | 30 g | Normal Temperature Spraying |
| 2 | 60000 (20) | Stearic Acid Ca (10) | Paraffin Wax (15) | Basic Ca Sulfonate (55) | None | 30 g | Normal Temperature Spraying |
| 3 | 60000 (25) | Stearic Acid Ca (10) | Paraffin Wax (10) | Basic Ca Sulfonate (55) | None | 30 g | Normal Temperature Spraying |
| 4 | 60000 (30) | Stearic Acid Ca (10) | Paraffin Wax (5) | Basic Ca Sulfonate (60) | None | 30 g | Normal Temperature Spraying |
| 5 | 60000 (20) | Stearic Acid Ca (10) | Paraffin Wax (15) | Basic Ca Phenate (50) | Graphite (5) | None | heated spray |

TABLE 2-continued

| Test No. | Polyisobutylene Average Molecular Weight | Metal Soap | Wax | Basic Metal Salt of Aromatic Organic Acid | Lubricant Powder | Organic Solvent (per total amount of 100 g of non-volatile components) | Application Method |
|---|---|---|---|---|---|---|---|
| | Non-volatile Components of Composition (numerical value in parentheses shows the content in mass %) | | | | | | |
| 6 | 60000 (2) | Stearic Acid Ca (14) | Paraffin Wax (15) | Basic Ca Salicylate (60) | PTFE (9) | 30 g | Normal Temperature Spraying |
| 7 | 60000 (40) | Stearic Acid Ca (10) | Paraffin Wax (15) | Basic Ca Sulfonate (26) | PTFE (9) | 30 g | Normal Temperature Spraying |
| 8 | 30000 (20) | Stearic Acid Ca (10) | Paraffin Wax (15) | Basic Ca Sulfonate (55) | None | 30 g | Normal Temperature Spraying |
| 9 | 40000 (20) | Stearic Acid Ca (10) | Paraffin Wax (15) | Basic Ca Sulfonate (55) | None | 30 g | Normal Temperature Spraying |
| 10 | 50000 (20) | Stearic Acid Ca (10) | Paraffin Wax (15) | Basic Ca Sulfonate (55) | None | 30 g | Normal Temperature Spraying |
| 11 | None | Stearic Acid Ca (10) | Paraffin Wax (15) | Basic Ca Sulfonate (75) | None | 30 g | Normal Temperature Spraying |
| 12 | Compound Grease defined in API Standards BUL 5A2 | | | | | | Brush |

[Test No. 1]

In Test No. 1, finish machine grinding was performed on the pin surface and the box surface. Thereafter, a composition for forming a lubricant coating layer was applied onto both the pin surface and the box surface by spraying at normal temperature (approximately 25° C.) to form lubricant coating layers. Regarding the coating thickness of the lubricant coating layer, a target average coating thickness was calculated using the weight and specific gravity of the composition to be applied per unit area and unit time based on a predetermined spraying pressure and a distance to the target surface, and application was performed so that the value thereof was in the range of 120 to 150 μm.

[Test No. 2 to Test No. 4 and Test No. 8 to Test No. 10]

In Test No. 2 to Test No. 4 and Test No. 8 to Test No. 10, finish machine grinding was performed on the pin surface and the box surface. The pin was immersed in a solution for zinc phosphate chemical conversion treatment at 75 to 85° C. for 10 minutes to form a zinc phosphate layer having a thickness of 10 μm. The box was immersed in a solution for manganese phosphate chemical conversion treatment at 80 to 95° C. for 10 minutes to form a manganese phosphate layer having a thickness of 12 μm. Thereafter, a composition for forming a lubricant coating layer was applied onto both the pin surface and the box surface by spraying at normal temperature (approximately 20° C.) to form lubricant coating layers. With regard to the thickness of the lubricant coating layer, a target average coating thickness was calculated using the weight and specific gravity of the composition to be applied per unit area and unit time based on a predetermined spraying pressure and the distance to the target surface, and application of the composition was performed so that the value of the thickness was in the range of 120 to 150 μm.

[Test No. 5]

In Test No. 5, finish machine grinding was performed on the pin surface. The pin was immersed in a solution for zinc phosphate chemical conversion treatment at 75 to 85° C. for 10 minutes to form a zinc phosphate layer having a thickness of 10 μm. A lubricant coating layer was formed thereon by applying a composition for forming a lubricant coating layer onto the zinc phosphate layer by spraying at normal temperature (approximately 25° C.). Regarding the coating thickness of the lubricant coating layer, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

Finish machine grinding was performed on the box surface. Zn—Ni alloy plating was performed by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C. a current density of 2 A/dm$^2$, and a treatment time of 18 minutes. The Zn—Ni alloy plating layer had a composition of Zn: 85% and Ni: 15%. A lubricant coating layer was formed thereon by application of a composition for forming a lubricant coating layer by heated (approximately 110° C.) spray application and slow cooling. Regarding the coating thickness of the lubricant coating layer, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

[Test No. 6 and Test No. 7]

In Test No. 6 and Test No. 7, finish machine grinding was performed on the pin surface and the box surface. Thereafter, surface roughness was formed on the pin surface and the box surface by a blasting process. Thereafter, a composition for forming a lubricant coating layer was applied onto both the pin surface and the box surface by spraying at normal temperature (approximately 20° C.) to form lubricant coating layers. Regarding the coating thickness of the lubricant coating layer, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

[Test No. 11]

In Test No. 11, finish machine grinding was performed on the pin surface and the box surface. The pin surface was immersed in a solution for zinc phosphate chemical conversion treatment at 75 to 85° C. for 10 minutes to form a zinc phosphate layer having a thickness of 10 μm. The box surface was immersed in a solution for manganese phosphate chemical conversion treatment at 80 to 95° C. for 10 minutes to form a manganese phosphate layer having a thickness of 12 μm. Thereafter, a composition for forming a lubricant coating layer was applied onto both the pin surface and the box surface by spraying at normal temperature (approximately 25° C.) to form lubricant coating layers. Regarding the coating thickness of the lubricant coating layer, a target average coating thickness was calculated using the weight and specific gravity of the composition to be applied per unit area and unit time based on a predetermined spraying pressure and the distance to the target surface, and application was performed so that the value thereof was in the range of 120 to 150 μm. In Test No. 11, polyisobutylene was not contained in the composition.

[Test No. 12]

In Test No. 12, the pin surface and the box surface were subjected to finish machine grinding and a phosphate chemical conversion treatment. Thereafter, an API standards dope was applied to the pin surface and the box surface by brushing. The term “API standards dope” refers to compound grease for threads for oil country tubular goods that is manufactured in accordance with API BUL 5A2. It is defined that the composition of the API standards dope adopts grease as a base material, and contains, graphite powder: 18±1.0%, lead powder: 30.5±0.6%, and copper flake: 3.3±0.3%. Note that, it is understood that, within this component range, compound greases for threads for oil country tubular goods have equivalent performance.

[Galling Resistance Evaluation Test]

Evaluation of the galling resistance was performed by means of a repeated fastening test. Using the pins and boxes of Test No. 1 to Test No. 12, fastening and loosening were repeated at the room temperature (about 25° C.), and the galling resistance was evaluated. The fastening torque was set to 24350 N·m. Each time one cycle of fastening and loosening was completed, the pin surface and box surface were visually observed. The occurrence of galling on threaded portions and metal seal portions was examined by visual inspection. With respect to the metal seal portions, the test was ended upon the occurrence of galling. When the galling on the threaded portion was minor and was repairable by repairing by filing or the like, the galling flaws were corrected and the test was continued. The maximum number of times for repeating fastening was set as 15 times. The maximum number of times fastening was performed without either unrepairable galling occurring at a threaded portion or galling occurring at a metal seal portion was adopted as the evaluation index for galling resistance. The results are shown in the “Galling Resistance (number of times of fastening completed without either unrepairable galling occurring at a threaded portion or galling occurring at a metal seal portion)” column in Table 3.

Note that, in Test No. 12, the API standards dope was re-applied and newly used each time that fastening and loosening was performed once. This is because, normally, the API standards dope is re-applied and newly used each time that fastening and loosening are performed once. Further, the foregoing usage method is the only method that is assumed as a usage method for the API standards dope. On the other hand, in Test No. 1 to Test No. 11, the respective tests were continued without forming the lubricant coating layer again until the test ended.

TABLE 3

| Test No. | Galling Resistance (number of times of fastening completed without either unrepairable galling occurring at a threaded portion or galling occurring at a metal seal ortion) | Torque on Shoulder Resistance ΔT' (relative value) |
|---|---|---|
| 1 | 15 | 120 |
| 2 | 15 | 138 |
| 3 | 15 | 144 |
| 4 | 15 | 151 |
| 5 | 15 | 130 |
| 6 | 15 | 110 |
| 7 | 10 | 143 |
| 8 | 15 | 120 |
| 9 | 15 | 115 |
| 10 | 15 | 128 |
| 11 | 10 | 60 |
| 12 | 10 | 100 |

[High Torque Performance Evaluation Test]

Figure 12:
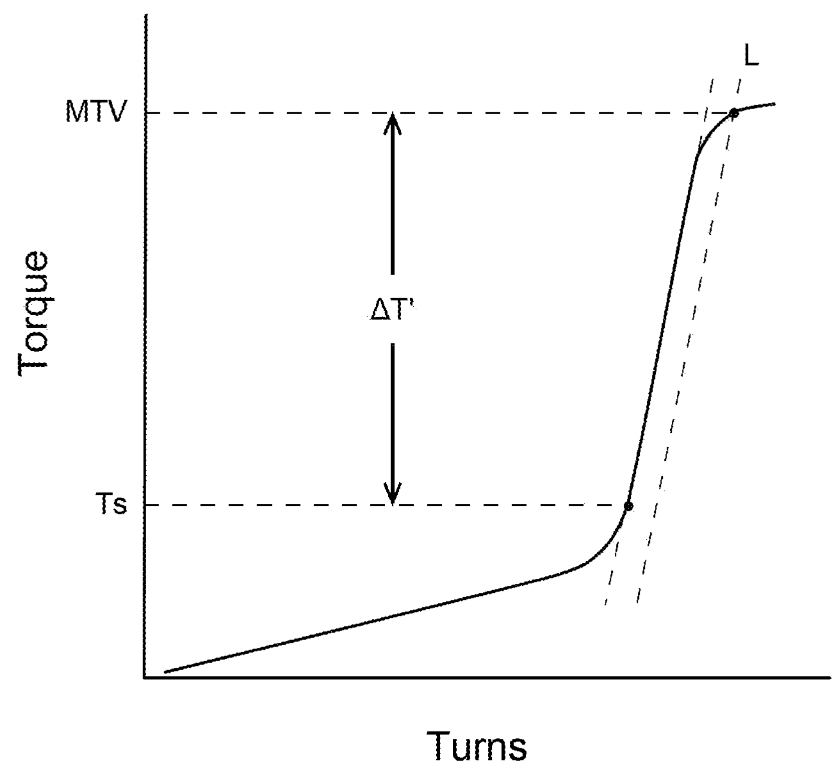
FIG. 12 is a graph for describing torque on shoulder resistance ΔT' in an example.

Using the pins and boxes of Test No. 1 to Test No. 12, the torque on shoulder resistance ΔT' was measured. Specifically, fastening was performed under conditions of a tightening speed of 10 rpm and a tightening torque of 42.8 kN·m. The torque at the time of fastening was measured, and a torque chart as illustrated in FIG. 12 was prepared. Reference characters “Ts” in FIG. 12 denote the shouldering torque. Reference characters “MTV” in FIG. 12 denote a torque value at which a line segment L and the torque chart intersect. The line segment L is a straight line that has the same slope as the slope of a linear region of the torque chart after shouldering, and for which the number of turns is 0.2% more in comparison to the aforementioned linear region. Normally, Ty (yield torque) is used when measuring the torque on shoulder resistance ΔT'. However, in the present example, the yield torque (boundary between a linear region and a non-linear region in the torque chart after shouldering) was indistinct. Therefore, MTV was defined using the line segment L. The difference between MTV and Ts was taken as the torque on shoulder resistance ΔT' of the present example. The high torque performance was determined as a relative value with respect to the torque on shoulder resistance ΔT' when an API standards dope was used instead of a lubricant coating layer in Test No. 12 as a reference (100). The results are shown in Table 3.

[Evaluation Results]

Referring to Table 1 to Table 3, the compositions for forming the lubricant coating layers of the threaded connections for pipes of Test No. 1 to Test No. 10 contained polyisobutylene. Therefore, even when fastening and loosening were repeated 10 times, galling did not occur and the threaded connections for pipes exhibited excellent galling resistance. In addition, the threaded connections for pipes exhibited excellent high torque performance, with the high torque performance being more than 100.

In the threaded connections for pipes of Test No. 1 to Test No. 5 and Test No. 8 to Test No. 10, the content of polyisobutylene was 5 to 30%. Therefore, the high torque performance was improved much more than in the threaded connection for pipes of Test No. 6 (polyisobutylene content of less than 5%). In addition, the number of times fastening could be performed without galling was higher than for the threaded connection for pipes of Test No. 7 (polyisobutylene content of more than 30%), and thus the threaded connections for pipes of Test No. 1 to Test No. 5 and Test No. 8 to Test No. 10 exhibited even more excellent galling resistance.

On the other hand, the composition for forming a lubricant coating layer of the threaded connection for pipes of Test No. 11 did not contain polyisobutylene. Therefore, the number of times fastening could be performed without galling and the high torque performance were both low.

An embodiment of the present disclosure has been described above. However, the foregoing embodiment is merely an example for implementing the present disclosure. Accordingly, the present disclosure is not limited to the above embodiment, and the above embodiment can be appropriately modified within a range which does not deviate from the gist of the present disclosure.

REFERENCE SIGNS LIST

1: Steel pipe
2: Coupling
3: Pin
4: Box
21: Lubricant coating layer
31: Pin-side threaded portion
32: Pin-side metal seal portion
33: Pin-side shoulder portion
34: Pin-side contact surface
41: Box-side threaded portion
42: Box-side metal seal portion
43: Box-side shoulder portion
44: Box-side contact surface

The invention claimed is:

1. A threaded connection for pipes used to fasten oil country tubular goods, comprising:
a pin having a pin-side contact surface including a pin-side threaded portion;
a box having a box-side contact surface including a box-side threaded portion; and
a lubricant coating layer comprising:
polyisobutylene: 5 to 25 mass %,
a metal soap: 2 to 30 mass %,
a wax: 2 to 30 mass %, and
a basic metal salt of an aromatic organic acid: 10 to 70 mass %,
when a total amount of non-volatile components in the lubricant coating is taken as 100 mass %,
wherein
the lubricant coating is as an outermost layer on or above at least one of the pin-side contact surface and the box-side contact surface,
the average molecular weight of the polyisobutylene is 50,000 to 100,000, and
the polyisobutylene is a semi-solid polymer with high viscosity.

2. The threaded connection for pipes according to claim 1, wherein:
the threaded connection comprises the lubricant coating layer on or above the pin-side contact surface.

3. The threaded connection for pipes according to claim 2, wherein:
the threaded connection further comprises a plating layer between the pin-side contact surface and the lubricant coating layer.

4. The threaded connection for pipes according to claim 3, wherein:
the threaded connection further comprises a chemical conversion treatment layer between the lubricant coating layer and the plating layer.

5. The threaded connection for pipes according to claim 2, wherein:
the pin-side contact surface is a surface that is subjected to one or more types of treatment selected from the group consisting of a blasting treatment and pickling.

6. The threaded connection for pipes according to claim 3, wherein:
the plating layer surface is a surface that is subjected to one or more types of treatment selected from the group consisting of a blasting treatment and pickling.

7. The threaded connection for pipes according to claim 1, wherein:
the threaded connection comprises the lubricant coating layer on or above the box-side contact surface.

8. The threaded connection for pipes according to claim 7, wherein:
the threaded connection further comprises a plating layer between the box-side contact surface and the lubricant coating layer.

9. The threaded connection for pipes according to claim 8, wherein:
the threaded connection further comprises a chemical conversion treatment layer between the lubricant coating layer and the plating layer.

10. The threaded connection for pipes according to claim 7, wherein:
the box-side contact surface is a surface that is subjected to one or more types of treatment selected from the group consisting of a blasting treatment and pickling.

11. The threaded connection for pipes according to claim 8, wherein:
the plating layer surface is a surface that is subjected to one or more types of treatment selected from the group consisting of a blasting treatment and pickling.

12. The threaded connection for pipes according to claim 1, wherein:
the pin-side contact surface further includes a pin-side metal seal portion and a pin-side shoulder portion; and
the box-side contact surface further includes a box-side metal seal portion and a box-side shoulder portion.

13. A composition for forming the lubricant coating layer on or above the threaded connection for pipes according to claim 1, the composition comprising:
the polyisobutylene: 5 to 25 mass %,
the metal soap: 2 to 30 mass %,
the wax: 2 to 30 mass %, and
the basic metal salt of an aromatic organic acid: 10 to 60 mass %,
when a total amount of non-volatile components in the composition is taken as 100 mass %,
wherein the average molecular weight of the polyisobutylene is 50,000 to 100,000, and
the polyisobutylene is a semi-solid polymer with high viscosity.

14. The composition according to claim 13, wherein:
the composition further comprises:
a lubricant powder.

15. The composition according to claim 14, wherein:

when a total amount of non-volatile components in the composition is taken as 100 mass %, the composition comprises:

the lubricant powder: 0.5 to 20 mass %.

16. The composition according to claim 14, wherein:

the lubricant powder is one or more types selected from the group consisting of graphite and polytetrafluoroethylene.

17. The composition according to claim 13, wherein:

the composition further comprises:

a volatile organic solvent.

* * * * *